United States Patent [19]
Winkler

[11] Patent Number: 5,378,355
[45] Date of Patent: Jan. 3, 1995

[54] DIRECT DELIVERY IN-SITU DIFFUSER CLEANING

[75] Inventor: William W. Winkler, Delafield, Wis.

[73] Assignee: Water Pollution Control Corporation, Brown Deer, Wis.

[21] Appl. No.: 984,122

[22] Filed: Dec. 4, 1992

[51] Int. Cl.⁶ .............................................. C02F 3/20
[52] U.S. Cl. .................... 210/136; 210/199; 210/220; 210/232; 261/122.2; 134/22.12; 134/171
[58] Field of Search ............... 210/740, 741, 747, 754, 210/136, 170, 199, 205, 220, 232; 134/3, 18, 22.12, 12, 22.18, 28, 29, 30, 42, 170, 171; 261/121.1, 121.4, 122.2

[56] References Cited

U.S. PATENT DOCUMENTS

| Re. 33,177 | 3/1990 | Schmit et al. | 210/754 |
|---|---|---|---|
| 2,689,714 | 9/1954 | French | 261/39 |
| 3,150,007 | 9/1964 | Kovachy | 134/4 |
| 3,206,178 | 9/1965 | Lamb | 261/122 |
| 4,098,695 | 7/1978 | Novotny | 210/232 |
| 4,152,259 | 5/1979 | Molvar | 210/220 |
| 4,238,244 | 12/1980 | Banks | 134/34 |
| 4,382,867 | 5/1983 | Schmit et al. | 210/754 |
| 4,419,141 | 12/1983 | Kunkel | 134/22.12 |
| 4,477,341 | 10/1984 | Schweiss et al. | 210/221.2 |
| 4,634,312 | 1/1987 | Sterzel | 134/171 |
| 5,051,193 | 9/1991 | Cummings, Jr. | 210/754 |

OTHER PUBLICATIONS

Water Pollution Control Federation and American Society of Civil Engineers, "Aeration A Wastewater Treatment Process", p. 56, WPCF—Manual of Practice No. FD-13, ASCE—Manual and Reports on Engineering Practice—No. 68.

Primary Examiner—Thomas Wyse
Attorney, Agent, or Firm—Pollock, Vande Sande & Priddy

[57] ABSTRACT

This disclosure relates to aeration, especially biological treatment of wastewater with fine pore diffusers and in situ cleaning of these diffusers with liquid and/or gaseous cleaning fluids supplied to the diffusers through cleaning fluid channels that respectively have separate and direct connections to plural diffusers. Aeration and cleaning of fine pore diffusers is described in which cleaning fluid is conducted from a source of such fluid to a multiplicity of diffusers via a flow path which is separate from a flow path which conveys aeration gas to the diffusers. Methods of fabricating aeration gas distribution assemblies are also disclosed. One such method involves securing to an aeration gas distribution conduit at least a portion of a cleaning fluid distribution channel which includes one or more cleaning fluid distribution conduits and further includes connectors coupled to the cleaning fluid distribution conduits. The connectors are spaced longitudinally along the cleaning fluid distribution conduits at the same intervals as, and are connected to, the plenums. Another method comprises fabricating a cleaning fluid conduit having longitudinally spaced tee connectors coupled thereto. An aeration gas conduit having longitudinally spaced plenums secured thereto is fabricated, and such plenums are have holes for receiving the tee connectors coupled to the cleaning fluid conduit. The invention effectively and economically brings cleaning fluid in contact with diffusion elements without lengthy interruptions in wastewater treatment, complicated processing sequences and back-flow of wastewater through the elements, and can be used with diffusers having back-flow prevention capabilities, including membrane diffusers.

37 Claims, 7 Drawing Sheets

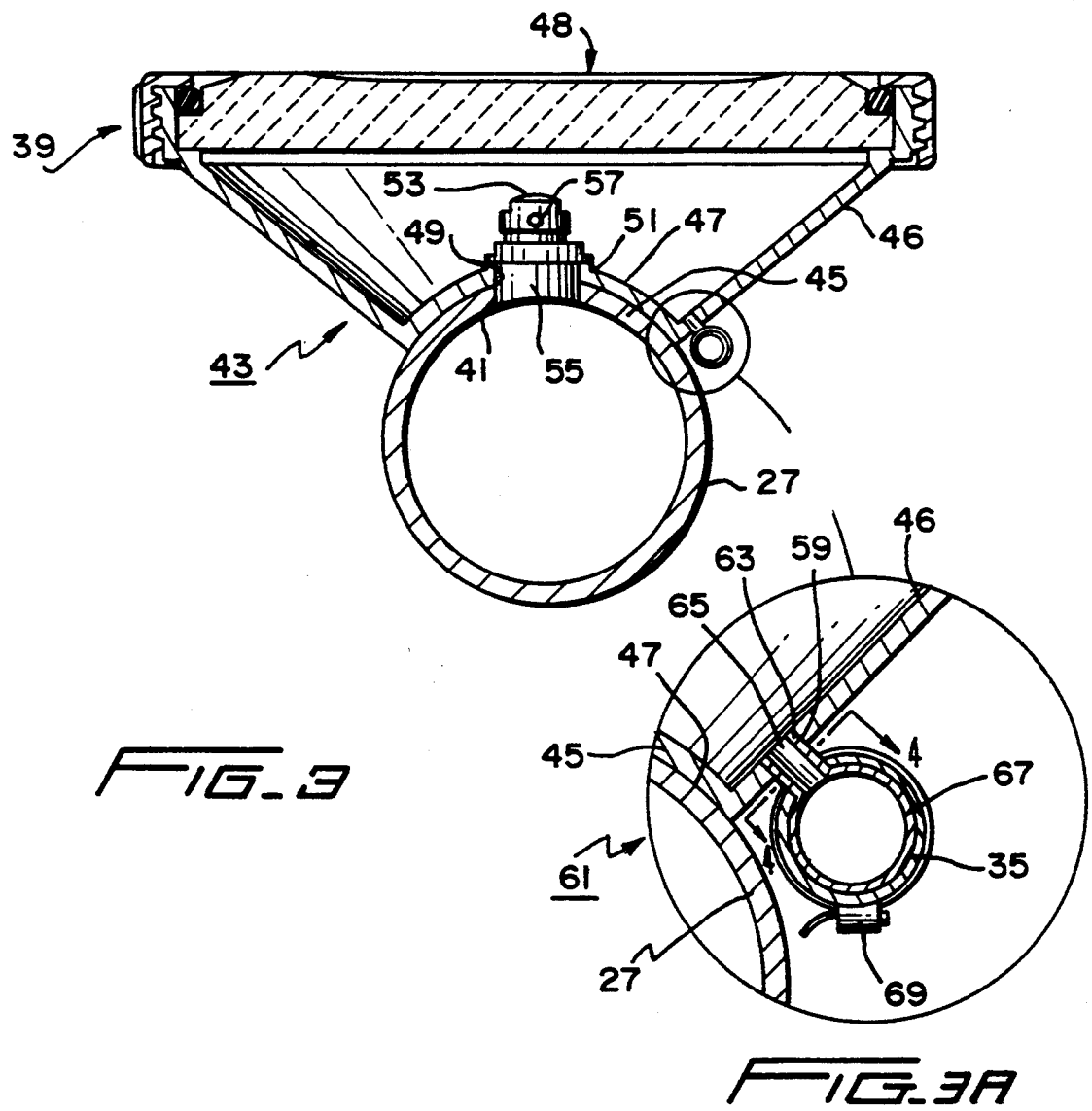
FIG_3
FIG_3A
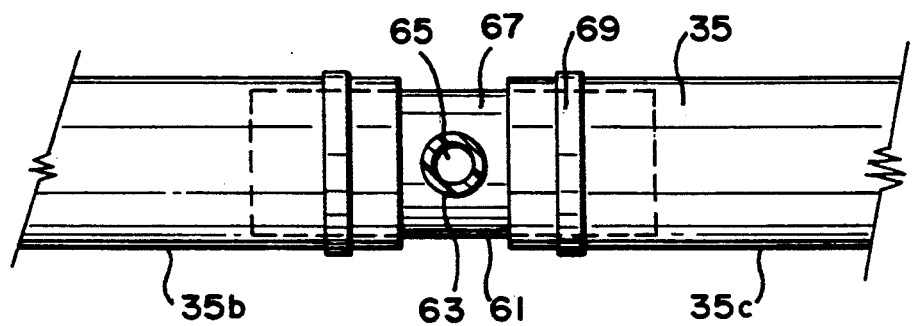
FIG_4

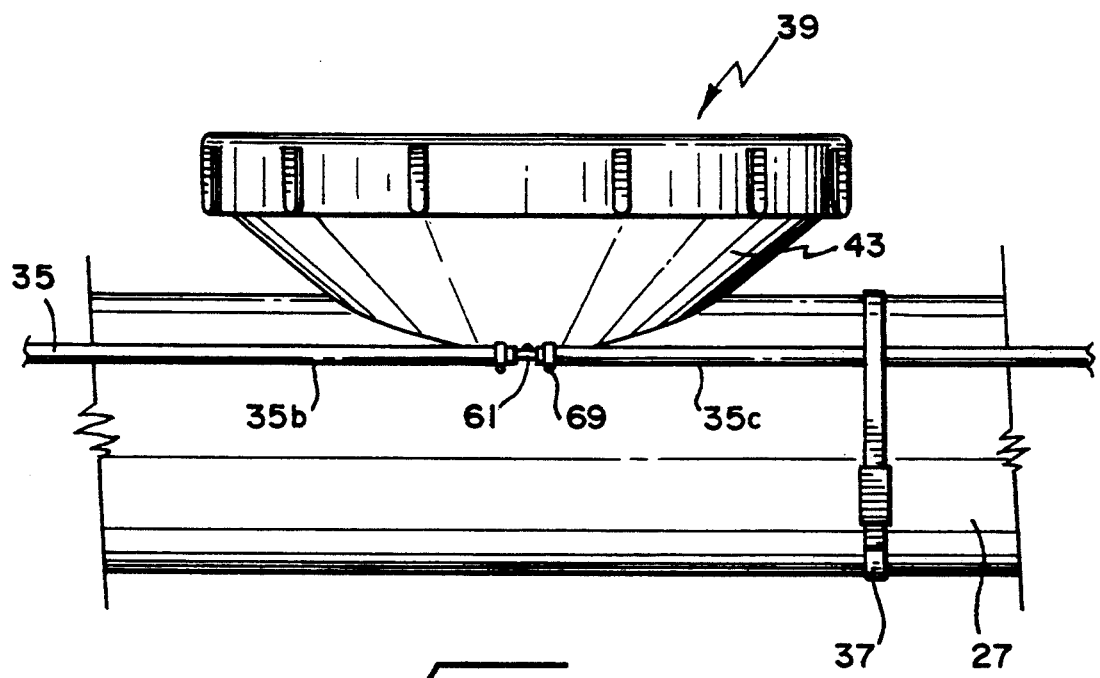
FIG. 5
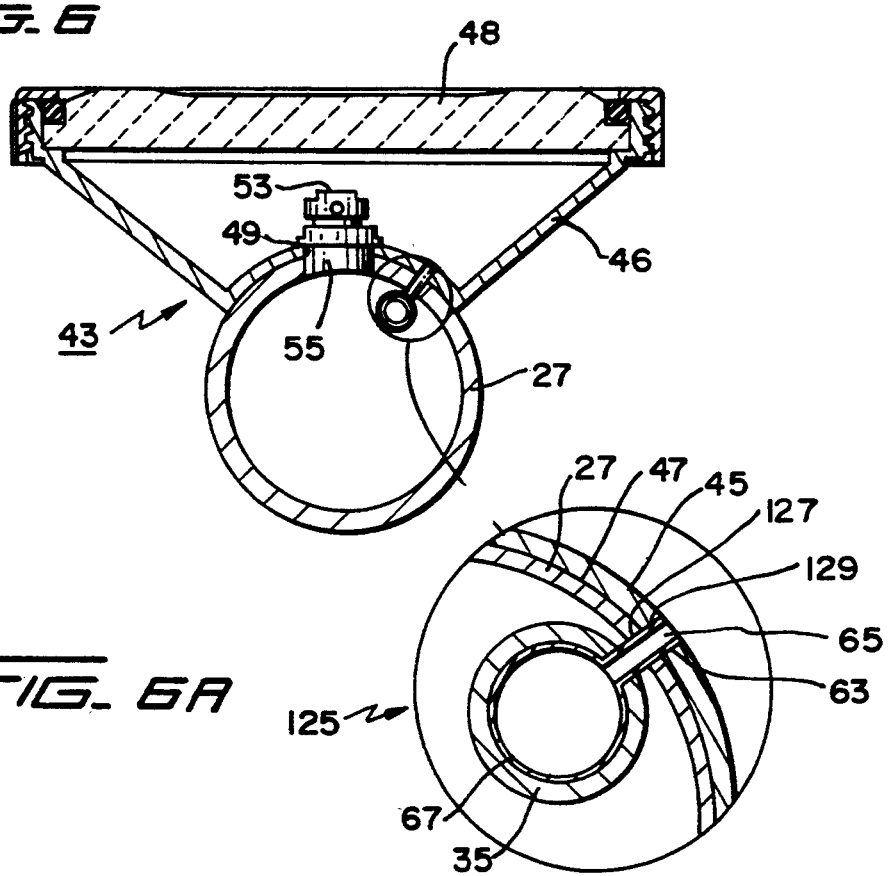
FIG. 6
FIG. 6A

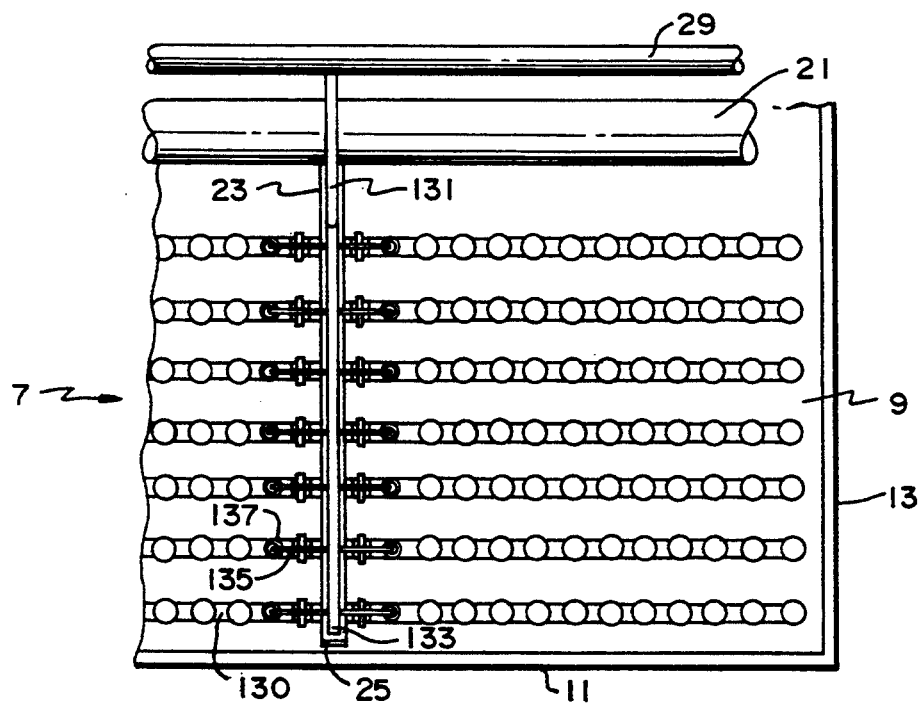
FIG_7
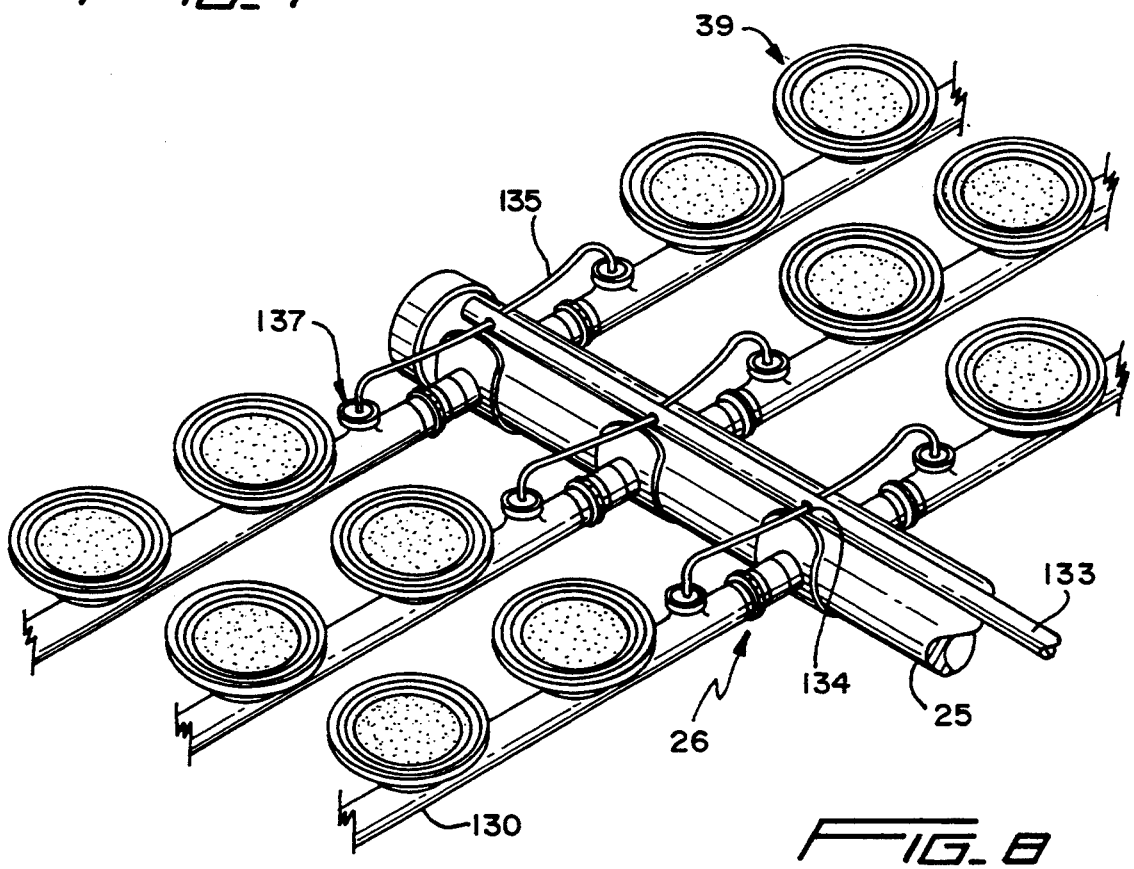
FIG_8

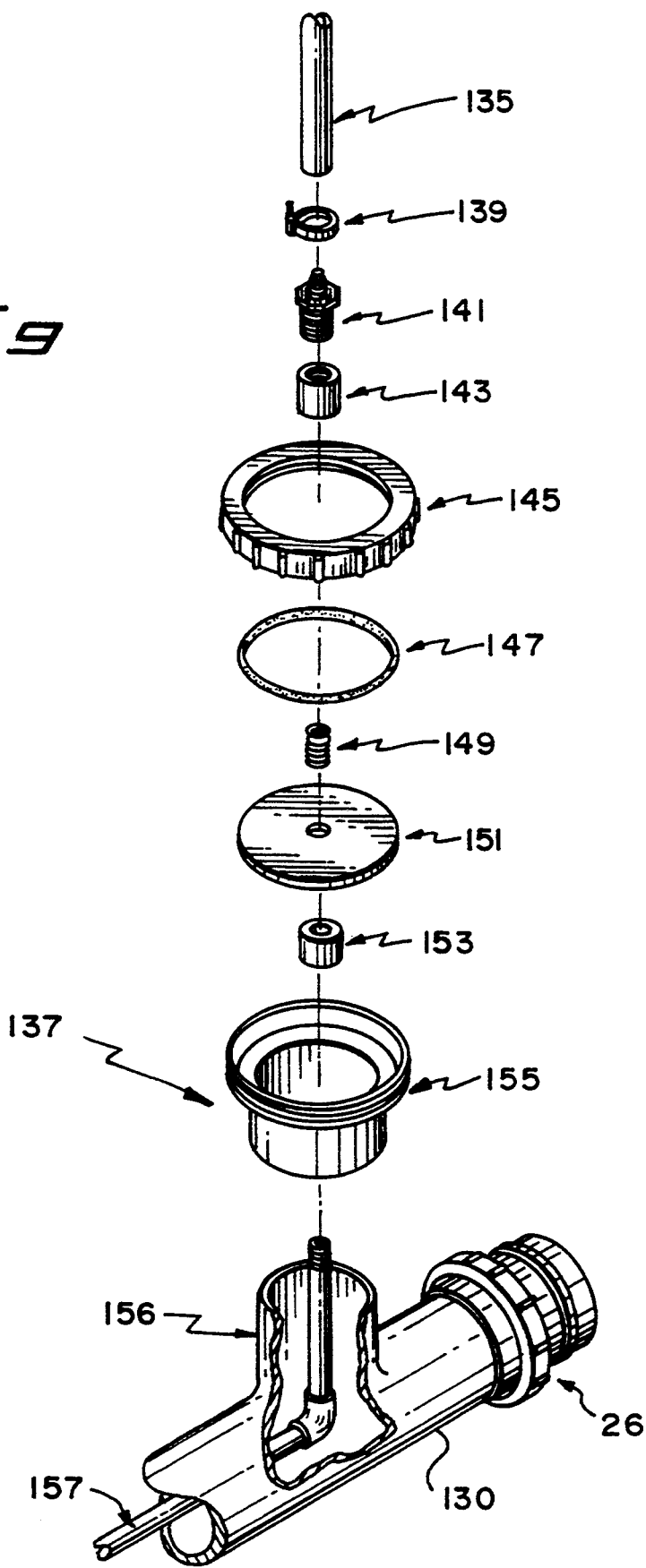

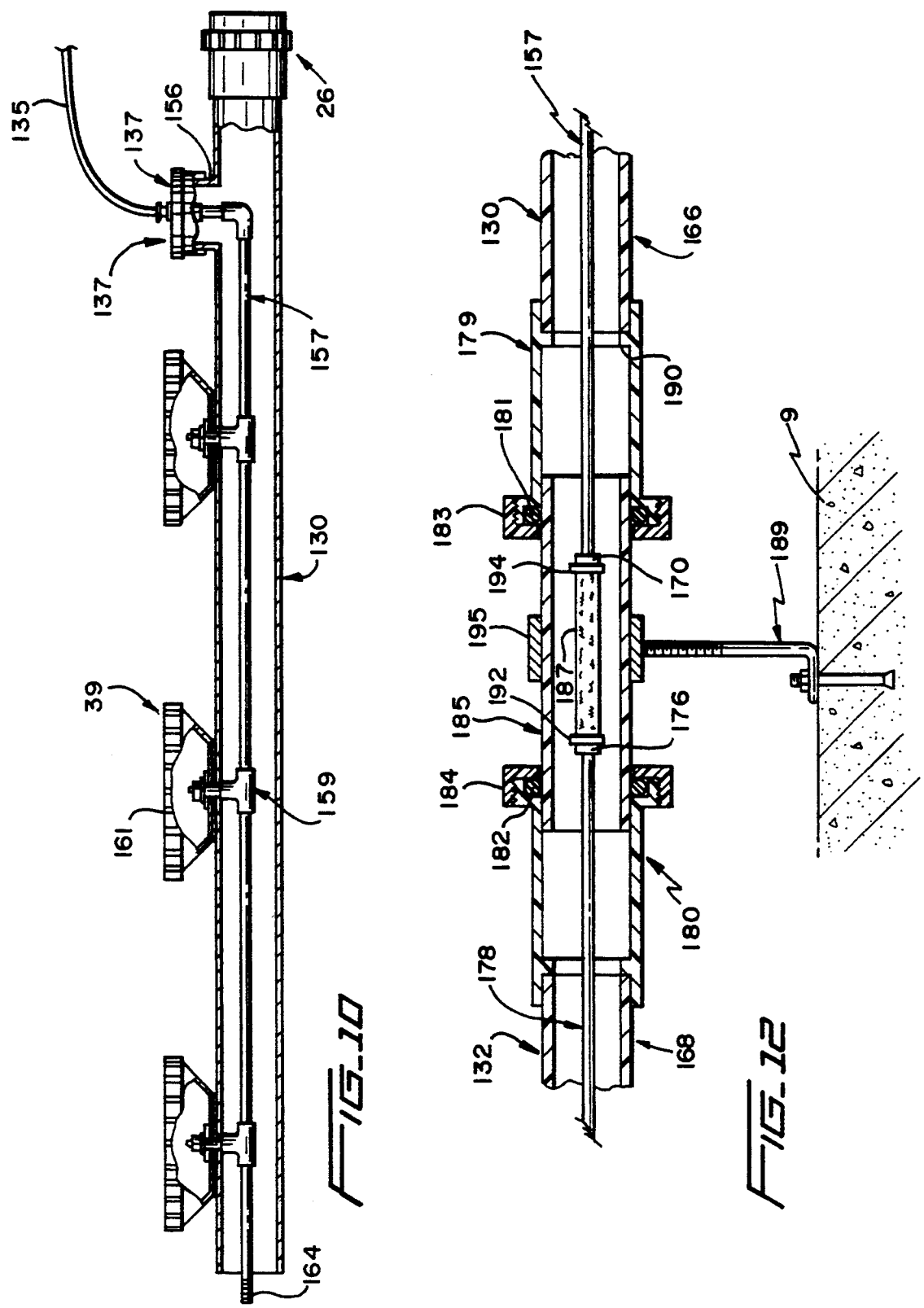

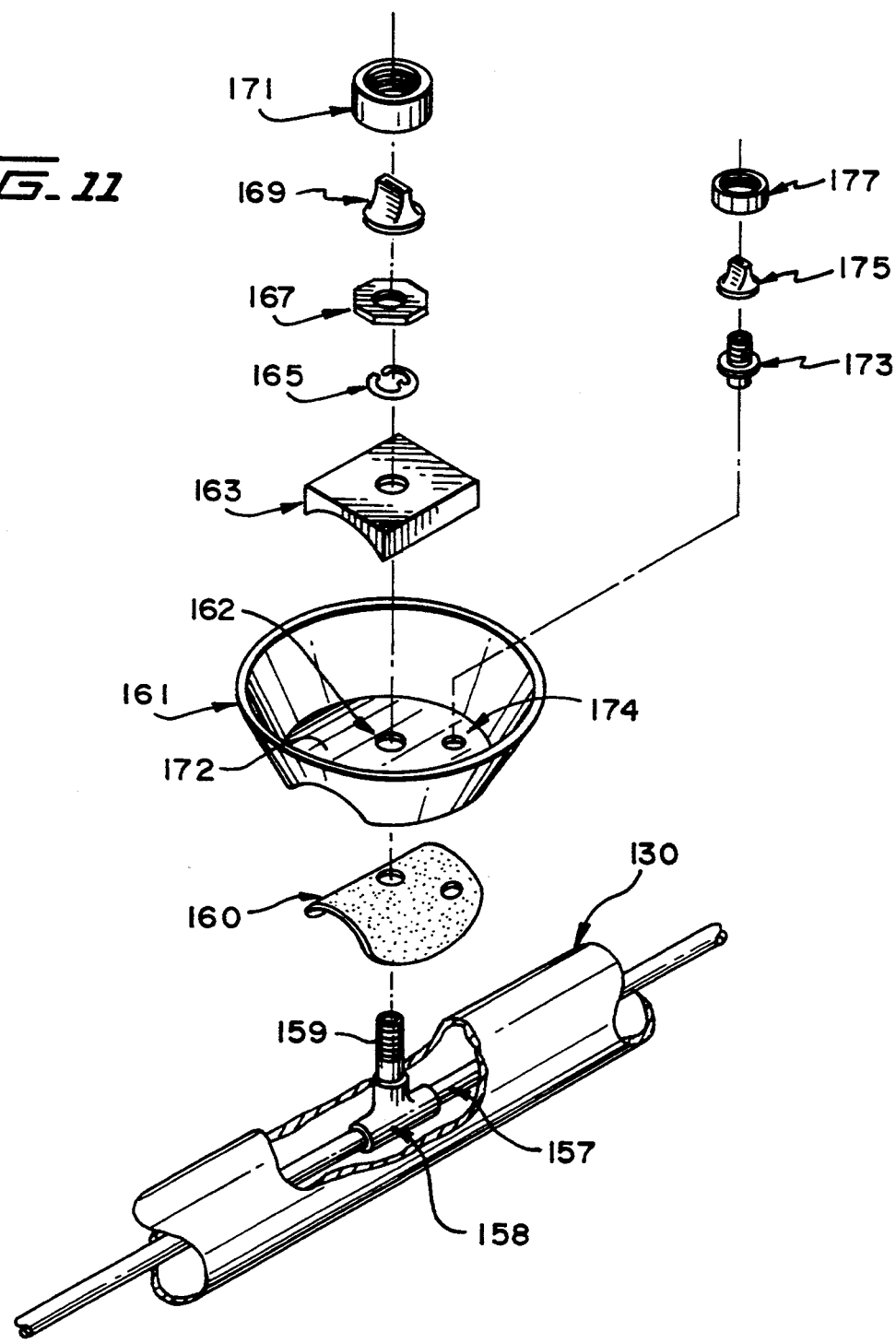

DIRECT DELIVERY IN-SITU DIFFUSER CLEANING

CROSS REFERENCE TO RELATED APPLICATIONS

This disclosure incorporates by reference the entire subject matters of U.S. patent applications Ser. Nos. 420,245; 781,869; 698,973; 426,041, 203,834 and 191,974 and the several patents which are identified below: Ser. No. 420,245, filed Oct. 12, 1989, now pending, a continuation of Ser. No. 698,973, filed Feb. 6, 1985, issued as U.S. Pat. No. 4,889,620, which was a continuation of Ser. No. 426,041, filed Sep. 28, 1982, now abandoned, which was a division of Ser. No. 203,834, filed Nov. 4, 1980, now U.S. Pat. No. 4,382,867, which was a continuation-in-part of Ser. No. 191,974, filed Sep. 29, 1980, now abandoned; Ser. No. 781,869, filed Sep. 30, 1985, issued as U.S. Pat. No. RE 33,177, was an application for reissue of U.S. Pat. No. 4,382,867; and Canadian Patent No. 1,152,979.

TECHNICAL FIELD

The invention relates to aeration of aqueous liquids in water impounds, preferably in tank-type processes, with fine pore diffusers. In a preferred embodiment, it relates to biological treatment of wastewater including aeration with fine pore diffusion elements and in situ cleaning of such elements with cleaning fluids that comprise liquids and/or gases, including vapors.

BACKGROUND OF THE INVENTION

The aeration of waste liquid media, including for example domestic sewage and industrial wastewaters, using submerged aeration devices, is an old art. A common aeration device is the fine pore diffuser. It transfers oxygen to wastewater by producing in the wastewater a discharge of small bubbles of a treatment gas such as air or other oxygen-containing gas.

In a fine pore diffuser, the component which actually produces the bubbles is a porous medium, sometimes referred to as a diffusion element, through which aeration gas received in the diffuser is forced into the wastewater. Porous media of various types have been used for this purpose.

MPDEs (multi-pore diffusion elements), the porous media employed in fine pore diffusers of the MPDE type, have been used in various forms for many years. These elements have been made for example by sintering of ceramic grains in the form of square or rectangular plates, as was popular from the 1920s through the mid-1950s, and to a lesser extent in the late 1950s and 1960s. An MPDE diffuser in which the element was formed of grains sintered in a dome shape was introduced in the mid-1940s, and enjoyed growing popularity in the 1950s, 1960s and 1970s. Diffusers with flat, disk-shaped elements formed of sintered ceramic or plastic grains were used in the 1970s and became popular in the 1980s. Voids between the sintered grains provide gas passages through which aeration gas may flow and discharge from an upper surface of the diffuser as small gas bubbles. Membrane fine pore diffusers, formed from sheet-like webs of synthetic elastomeric material, became popular in the 1980s. These webs, which may be of circular, rectangular, square or other shape, as viewed in plan view, have many small gas passages extending through them for discharging small bubbles.

Fouling of submerged fine pore diffusers is an old problem. Organic and/or inorganic foulants tend to progressively foul the diffusion elements at the point of release of aeration gas into the wastewater, and may also foul the air passages internally. Such fouling can impair the uniformity of gas distribution from aeration devices, and can increase the pressure differential required to drive the aeration gas through the aeration devices at a given flow rate.

The use of gas cleaning to confront the fouling problem received limited attention during the 1930s, 1940s and early 1950s. Early efforts concentrated on the cleaning of MPDEs. In 1939, W. M. Franklin cleaned the diffusers in several tanks of a wastewater treatment plant in Charlotte, N.C., introducing the cleaning gas through the same piping system which normally supplied air to the plenums for the diffusers. Based on his relatively few applications of cleaning gas at Charlotte, Franklin reported that the method was successful. See W. M. Franklin, "Purging Diffuser Plates With Chlorine," Water Works & Sewerage, June 1939, pages 232–233.

Further trials were made by R. B. Jackson at Jackson, Mich. The initial runs reportedly gave satisfactory results. See R. B. Jackson's article entitled "Maintaining Open Diffuser Plates With Chlorine," Water Works & Sewerage, September, 1942, pages 380–382. However, the last attempt reported in the article failed completely and inexplicably.

Franklin's and Jackson's articles were followed by trials at major wastewater treatment plants in Chicago and New York. In these trials it was found that the technique failed to clean the diffusers. Also, it was disclosed that the attempts at gas cleaning in Chicago and New York had actually impaired the diffusers by increasing their permeability and making them more difficult to clean by other methods. See the "Manual of Practice No. 5," Federation of Sewage and Industrial Wastes Associations, Champaign, Ill., 1952, pages 60–61.

In 1951, E. P. Coombs, inventor of the ASL (Activated Sludge Limited) dome diffuser and then managing director of ASL, spoke at a meeting of the Institute of Sewage Purification. His remarks included a warning against the use of gas cleaning on the grounds that it could clean some but not all of the pores of the diffusion elements and thus produced only a very temporary effect. In a guide to cleaning of MPDEs which was apparently first circulated in January 1953, ASL made clear that use of gas cleaning in their diffusers was definitely not recommended.

From the early 1950s forward through 1980, there was a dearth of reports of new activity with respect to gas cleaning of MPDEs. The 1971 edition of Manual of Practice No. 5 did nothing to explain away or dilute the previous unfavorable reports. ASL did not back away from their contrary position, but rather insisted that removal of the diffusion elements from the tanks and burning them in a kiln was the only truly satisfactory way of cleaning them. A variety of experts wrote articles and surveys on cleaning methods for MPDEs without any mention whatsoever of gas cleaning.

On Sep. 29 and Nov. 4, 1980, Frank L. Schmit, David T. Redmon, and Lloyd Ewing filed U.S. patent applications Ser. Nos. 191,974 and 203,834. The latter application issued May 10, 1983 as U.S. Pat. No. 4,382,867 entitled "In Place Gas Cleaning of Diffusion Elements" and disclosed a method of cleaning MPDEs in place with cleaning gas while submerged in liquid media by applying said cleaning gas intermittently or continuously to said diffusion elements between predetermined limits of DWP (dynamic wet pressure) or BRP (bubble release pressure) through flow regulation means and plenums for the diffusion elements. On Nov. 5, 1980, Schmit, the President of WPCC (Water Pollution Control Corporation), gave a speech to the EPA/W-WEMA (U.S. Environmental Protection Agency/Water and Wastewater Equipment Manufacturers' Association) Innovative Alternative Seminar in Chicago, Ill., in which he discussed WPCC's in-situ gas cleaning process and its effectiveness.

Initially, commercializing the WPCC process was difficult. Initial resistance on the part of potential customers, based mainly on concerns about the efficacy of the process, was consistent with the unfavorable reports reviewed above. However, the WPCC process and apparatus were successfully demonstrated in several plants, and developed a good record with respect to efficacy. Eventually, WPCC's gas cleaning process was recognized as effective, and, by 1992, WPCC had licensed about 150 plants for use of its patented gas cleaning process.

The Cummings patent, U.S. Pat. No. 5,051,193, entitled "Wastewater Treatment Process," and issued Sep. 24, 1991, to Paul W. Cummings, Jr., discloses processes for cleaning MPDEs with liquid acid solutions. The stated objectives of the Cummings processes are to provide better penetration of blocked pores, to reduce the quantity of acid used, and to extend the period of acid-element contact. Cummings discloses two alternative processes requiring a series of manipulative steps.

In what we refer to as Cummings' "back-flow mixture" process, an acid gas under pressure is made to fill the aeration piping network, the elements, and their plenums. The pressure in the network is then reduced to allow wastewater from the tank to back-flow into and through the pores of the elements into the plenums and piping to mix with the acid gas. Pressure is then reinstated in the network to force the resultant liquid acid into the pores. There is then a quiescent period of up to several hours, in which there is no significant flow of aeration gas into the wastewater while the acid reportedly "reacts" with the foulants. Then, pressure may again be decreased, to allow further back-flow, and then reinstated to force more liquid acid through the pores. The pulsation and quiescent periods are repeated as many times as necessary.

During the foregoing steps, which may consume a number of hours, the flow of aeration gas into the wastewater is negligible, compared to the aeration gas requirements of normal wastewater aeration treatment. Finally, sufficient pressure is maintained to force more acid through the pores and into the tank, followed by continuous flow of aeration gas at normal rates. This process requires an investment of considerable time, during which the aeration gas flow is interrupted.

A second alternative procedure disclosed by Cummings, herein called the "external mixture" process, employs an acid solution. Prepared above ground, it is made to fill the aeration piping network, the elements, and the plenums. A slight pressure is maintained to prevent back-flow of wastewater from the tank and to keep the acid solution in contact with the foulants. After a quiescent period during which the acid solution reportedly reacts with the foulants for the desired period of time, there may be pulsing and additional periods of quiescent reaction as used in the latter stages of the back-flow mixture process.

Here again, aeration gas flow may be interrupted for hours. Finally a normal flow of aeration gas is re-established, and more acid solution is driven out through the pores of the elements.

At present, wide-spread use of the Cummings methods has not developed. The method has been available for a few years, but there are very few operating installations. The explanation may lie in the fact that the method is subject to a number of limitations, shortcomings, and adverse perceptions.

One factor which may have discouraged widespread use of the back-flow mixture process is the number of steps and controls which can be involved, some of which may involve delicate adjustment or balancing of pressures and flows. These include initiation of acid gas flow; controlling the rate of acid gas flow and stopping at proper time to provide proper amount of gas in piping and plenums to achieve proper liquid acid concentration upon subsequent admixture of gas with liquor from tank; reduction of aeration gas flow sufficiently to cause back-flow; reinstating aeration gas flow to flood elements while controlling aeration gas flow to prevent complete expulsion of acid from piping, plenums and elements, controlling pressure within the piping and plenums during quiescent period to prevent further back-flow and expulsion of acid from element inward into plenum; repeating two previous steps as necessary; and reinstating aeration gas flow in such a manner as to produce pulsation.

A concern about the back-flow mixture process arises from the possibility of back-flow of sludge into the element. Depending on the height of the water above the diffusers, substantial driving force could be developed to force smaller solids into the pores, fouling the diffuser. It is not apparent whether the foulants will be pushed out again during cleaning or when the aeration gas flow is re-established. See "Aeration—A Wastewater Treatment Process," WPCF (Water Pollution Control Federation) Manual of Practice No. FD-13, page 56.

Another difficulty, which arises in the use of the Cummings external mixture process, involves the sheer volume of liquid acid required. A typical grid contains hundreds to a few thousand diffusers, and a typical plant has multiple grids. A grid of 1000 dome diffusers with 4" diameter distributor piping would require over 1000 gallons of liquid acid to fill the diffusers and the distributor piping. Also, 1000 gallons of liquid acid represents about eighteen 55-gallon drums, weighing approximately 460 pounds each. Moving these drums about the tank site will require hard labor or mechanized drum-handling equipment. Elimination of drum handling will require expenditures for large acid storage tanks and their attendant accessories and safety devices.

An additional concern with both of the Cummings processes arises from the fact that they involve keeping the distribution system partially filled with liquid acid while aeration gas is passing through it. It is anticipated that the passage of aeration gas over and through the liquid acid will strip acid gas from the liquid and convey this acid gas through the diffusers. The question thus arises as to whether, in conducting the Cummings processes, a sufficient amount of acid gas would be conducted through the diffusers so that the diffusers would be cleaned by the resultant cleaning gas-aeration gas mixture instead of or in addition to the liquid acid mixture. In acid gas cleaning systems, most of the cleaning occurs in the first 20 minutes of acid gas addition. Therefore, in order that the liquid acid used in the Cummings process might perform most of the cleaning, the question arises as to whether it may be necessary, in order to clean primarily with liquid acid according to Cummings' concept, to fill the distribution system with liquid acid in considerably less than 20 minutes.

Employing the above example of a grid of 1000 dome diffusers with one foot distribution spacing, application of the external mixture method to fill the diffusers and the distributor piping with 1000 gallons of liquid acid in the space of, for instance, 15 minutes would require pumping 67 gallons per minute of liquid acid. High rate pumping results in increased safety concerns. The high volume rate of acid pumping and the rapid switching between drums during the pumping process would increase the possibility of personnel being exposed to spills and splashing of the acid solution. Here again, provision of large acid storage tanks with their attendant accessories and safety devices could prove necessary to attain acceptable safety levels.

Another issue which may surface upon intensive use of the Cummings methods is whether it can be conveniently be determined when the diffusers have been cleaned. In line with the recommendations in the above-identified Schmit et al patent, Cummings suggests monitoring the condition of the diffusion elements, prior to cleaning, through the use of certain measuring devices which are capable of sensing the DWP (Dynamic Wet Pressure) across the elements. In gas cleaning, one can continue to monitor DWP during cleaning. However, DWP cannot be sensed during the quiescent conditions employed during liquid cleaning according to the Cummings patent. It may also happen that, even when there is gas flow during liquid acid cleaning as suggested by Cummings, that DWP measuring systems will not give accurate indications as to whether the elements have been fully cleaned until most if not all of the residual liquid acid has been driven from the system and the plant has returned to normal, stable operation. This could require a period of hours. If this is the case, then whenever treatment with a given batch of acid has been completed, there will be a delay in determining whether the elements have been fully cleaned, and whether or not a fresh batch of acid will have to be prepared for use in a subsequent cleaning step.

When soaking elements with liquid according to the Cummings processes, there is no appreciable aeration gas flow for extended periods. Interruptions of several hours are likely, during which the amount of treatment of wastewater BOD is greatly reduced. This is a distinct disadvantage when the plant is operating near its capacity or in an overloaded condition.

If, during use of the Cummings system-liquid-flooding process, one were to repetitively alternate between the quiescent periods taught by Cummings and the supplying of some amount of aeration gas to the wastewater, such as to dislodge foulants, or to provide the microorganisms in the wastewater with some oxygen or to maintain anoxic conditions suitable for phosphorous or nitrogen uptake, the onset of aeration gas flow will drive significant amounts of liquid acid cleaning agent from at least the upper portions of the aeration gas supply pipes and drive it out of the diffusers into the wastewater. Much of the liquid acid driven out of the diffusers in this manner will not therefore have an opportunity for extended contact with the gas passages in the diffusion elements. This acid will represent a waste in the sense that it must be replaced in order to begin another quiescent period.

The use of liquid acid solution for cleaning aeration devices in-situ as currently known in the art raises concerns about efficiency, complexity, back-flow of solids, repeated or extended interruption of aeration gas flow, safety, and cost. The present invention is aimed at reducing these difficulties.

SUMMARY OF THE INVENTION

In common with prior apparatus for aeration of water, of the type which includes provision for liquid or gas in situ cleaning, the invention, in one of its aspects, comprises a water impound having wall means including a floor for retention of water during aeration thereof. There is also an aeration gas channel including an attachment for connecting the channel with a source of aeration gas and having a plurality of aeration gas conduits. At least portions of these conduits extend generally horizontally within a zone in the impound which will be submerged in the water during aeration. Multiple fine pore diffusers are mounted at longitudinally spaced intervals along the lengths of, and in communication with the interiors of, the generally horizontal portions of the aeration gas conduits. At least one cleaning fluid channel is provided, and it has an inlet for receiving cleaning fluid from a source of such fluid and at least one conduit for conveying such fluid from said source to said impound for in situ cleaning of the diffusers.

The invention includes improvements upon the existing technology in which the cleaning fluid channel or channels include plural members that are within the aforementioned zone of the impound and that respectively have substantially separate and substantially direct connections to plural diffusers. The cleaning fluid channel or channels also define cleaning fluid flow paths which remain substantially separate from the aeration gas channel in those parts of said flow paths which extend from the above-mentioned cleaning fluid channel inlet to said diffusers.

In another of its aspects, the apparatus of the invention is of a type which is useful for aeration of wastewater with an aeration gas and comprises a tank having wall means including a floor for holding wastewater which is to be aerated by said aeration gas. The apparatus further includes a multiplicity of fine pore diffusers respectively comprising plenums and diffusion elements which are mounted in a portion of said tank and which will be submerged in said wastewater when said diffusers are in normal operation. There are also cleaning fluid conduits defining one or more cleaning fluid channels. These run from a source of cleaning fluid to the multiplicity of plenums, and are connected with said plenums for simultaneously feeding cleaning fluid from said source to said plenums and to the diffusion elements mounted thereon and for cleaning the diffusion elements. Moreover, there are aeration gas conduits defining one or more aeration gas channels separate from said cleaning fluid channel(s), running from a source of aeration gas to said plenums and connected with said plenums for supplying aeration gas thereto separately from said cleaning fluid.

The invention includes improvements upon existing processes for aeration of water with aeration gas conducted along an aeration gas flow path to and through fine pore diffusers submerged in liquid media. As in prior practice, the process of the present invention comprises conducting a flow of aeration gas from a source of said gas along a first flow path. This aeration gas is delivered via said first flow path to a multiplicity of fine pore diffusers that are submerged, distributed and spaced apart from one another in one or more horizontally disposed arrays in a body of water and that respectively have diffusion elements. Introduction of said aeration gas into said diffusers is accomplished through connections between said first flow path and said diffusers for causing discharge of said aeration gas through said diffusion elements, thereby aerating the water. These elements are subject to accumulation of foulant in and/or on the elements during such discharge. Organic and/or inorganic deposits tend to form within the elements or at their surfaces, particularly adjacent the liquid media.

However, in accordance with the process of the present invention, a flow of cleaning fluid which is aggressive toward such foulant is conducted from a source of said cleaning fluid along a second flow path, and is delivered to said multiplicity of diffusers via said second flow path. The flow of cleaning fluid is maintained substantially separate from said first flow path until said cleaning fluid reaches or nearly reaches said diffusers. Introduction of said cleaning fluid into said diffusers from said second flow path is employed for causing discharge of said cleaning fluid through said diffusion elements for controlling or removing such foulant.

The invention also includes methods of assembling apparatus for aeration of water with aeration gas. One such method comprises fabricating aeration gas distributor assemblies by securing to an aeration gas distribution conduit that is useful for defining at least a portion of an aeration gas channel, a plurality of plenums that are disposed at intervals of distance longitudinally along said conduit and are configured to receive diffusion elements useful for aerating water. This method also includes the step of securing to said plurality of plenums one or more cleaning fluid distribution conduits respectively defining a cleaning fluid channel that is substantially separate from said aeration gas channel for supplying cleaning fluid to said plenums substantially separately from said aeration gas.

Another method of the invention, for assembling apparatus for aeration of water with aeration gas, also comprises fabricating aeration gas distributor assemblies by securing to an aeration gas distribution conduit that is useful for defining at least a portion of an aeration gas channel, a plurality of plenums that are disposed at intervals of distance longitudinally along said conduit and are configured to receive diffusion elements useful for aerating water. This method further comprises securing to said aeration gas distribution conduit at least a portion of a cleaning fluid distribution channel which includes one or more cleaning fluid distribution conduits and further includes connectors that are coupled to said cleaning fluid distribution conduit(s) and are spaced longitudinally along said cleaning fluid distribution conduit(s) at the same intervals as, and are connected to, said plenums.

Another method of the invention that is useful for assembling apparatus for aeration of water with an aeration gas comprises fabricating at least a portion of a cleaning fluid channel comprising cleaning fluid conduit and plural tee connectors positioned at longitudinally spaced intervals along said channel portion, said tee connectors having base legs projecting laterally from said cleaning fluid channel portion. This method also includes fabricating at least a portion of an aeration gas channel that comprises aeration gas conduit that has a plurality of longitudinally spaced plenums secured thereto. Such plenums are configured to receive diffusion elements, are spaced apart by intervals substantially similar to those of the tee connectors, and have walls with holes therethrough for receiving said tee connector base legs. The cleaning fluid channel portion is secured to the aeration gas channel portion by securing the tee connector base legs in communication with said holes.

ADVANTAGES OF THE INVENTION

The present invention can be employed to effectively and economically bring cleaning fluid in contact with diffusion elements without the need for lengthy interruptions in the supply of aeration gas to the wastewater treatment process.

However, at least some embodiments of the present invention permit interruption of aeration gas flow during cleaning while minimizing wastage of cleaning agent.

Certain embodiments of the present invention offer a plant operator the opportunity to achieve greater independence between aeration gas flow and cleaning fluid utilization.

Moreover, acid concentration at the diffuser can be controlled to an extent not possible with the Cummings back-flow process. The ratio of cleaning fluid flow rate to aeration gas flow rate can be readily altered as desired and very high concentrations can be readily attained.

The invention can be practiced without complicated processing sequences, that is, fewer steps are required in the cleaning procedure.

No back-flow of the wastewater through the diffusers is required. Consequently, any potential for diffuser plugging which might otherwise result from such back-flow is avoided.

The invention is especially useful in systems in which the diffusers have back-flow preventing means. Such back-flow preventers are present in most membrane type diffusers in use today. Furthermore, back-flow preventers can be used in diffusers with sintered grain diffusion elements, such as porous ceramic and plastic disk type multi-pore diffusion elements. The above-mentioned Schmit et al U.S. Pat. No. 4,382,867 discloses several types of back-flow preventers.

A further advantage of this direct delivery method over the Cummings methods is that when liquid acid is used, less of it is required, as it is unnecessary to fill the aeration gas channels with liquid acid. Thus, less acid is ultimately forced into the wastewater, reducing any potential which may exist for harming the microorganisms in the wastewater. Reduced liquid acid consumption reduces operating cost.

As compared to the amounts used in existing liquid cleaning technology, the smaller volume of acid necessary for practice of the invention requires less handling, resulting in improved safety.

Direct delivery of cleaning fluid to diffusers allows frequent use of strong cleaning agents even if the submerged air header pipes in the plant are made of material which deteriorates seriously upon repeated exposure to the agent. Since the agent is delivered directly to the diffusers, the pipes are not exposed to the cleaning agent and only the diffusers need be made of materials highly resistant to the agent. Although this benefit applies to retro-fitting of existing plants which have corrosion-sensitive air header pipes, it also applies in new plants in which use of such pipes is desired.

The apparatus and method of the present invention also share the advantage of versatility. They permit use of liquid and/or gaseous cleaning fluid.

It is not uncommon for the compression of aeration gas to increase its temperature well above ambient and well above that of the wastewater. Because the aeration gas and cleaning fluid flow paths are separated over substantial portions if not substantially all of their respective lengths, the invention can be used to inhibit interchange of heat or components, reactive or unreactive, between the cleaning fluid and aeration gas, at least until they reach the diffusers. This, for example, can reduce heat losses from the cleaning fluid to the aeration gas, and facilitates delivery of cleaning fluid that is hotter than the aeration gas to the diffusers.

In one embodiment, cleaning fluid is conducted along a second flow path surrounded by but separate from a first flow path that conveys aeration gas to the diffusers. Because of the compression-induced increased temperature of the aeration gas relative to the wastewater, very hot cleaning fluid in the second flow path may be surrounded by aeration gas in the first flow path which is of lower temperature than the cleaning fluid but of higher temperature than the wastewater. This limits the temperature gradient across the wall of the conduit which separates the first and second flow paths, thus limiting heat losses from the cleaning fluid to wastewater surrounding the first flow path, and facilitates delivery of cleaning fluid that is hotter than the wastewater to the diffusers.

BRIEF DESCRIPTION OF THE DRAWINGS

FIG. 3 is a transverse, vertical cross-section through one of the diffusers of FIG. 2 taken on section line 3—3.

FIG. 3A is an enlargement of FIG. 3 to show in detail a connection between the plenum of FIG. 3 and a cleaning fluid channel in communication therewith.

FIG. 4 is a sectional view taken on section line 4—4 of FIG. 3A.

FIG. 5 is an exterior, side view of the diffuser shown in FIGS. 2 and 3 and the cleaning fluid channel of FIGS. 2, 3 and 4.

FIG. 6 is a sectional view, similar in aspect to FIG. 2, disclosing an additional embodiment of the invention similar to that illustrated in FIGS. 1-5 but having the cleaning gas channel mounted within the aeration gas channel.

FIG. 6A is an enlargement of FIG. 6 to show details of the connection between the cleaning gas channel and the diffuser plenum.

FIG. 7 is a schematic diagram including a fragmentary view of a sewage aeration system similar to FIG. 1 but having the cleaning fluid channels partially enclosed within the aeration gas channels.

FIG. 8 is a perspective view of portions of the conduits, a portion of the diffusers and a portion of the fluid conduit entry joints shown in FIG. 7.

FIG. 9 is an exploded and partially cut-away view of one of the fluid conduit entry joints shown in FIG. 8.

FIG. 10 is a cross-section of a segment of the cleaning fluid conduit within a segment of the aeration gas conduit shown in FIG. 7 and 8, a portion of the diffusers shown in FIGS. 7 and 8, and the fluid conduit entry joint shown in FIGS. 8 and 9.

FIG. 11 is an exploded and partially cut-away view of one of the connections between the cleaning fluid conduit and the plenum and one of the connections between the aeration gas conduit and the plenum shown in FIG. 10

FIG. 12 is a cross-section of one of the joints between two segments of the cleaning fluid conduit within the aeration gas conduit shown in FIG. 10.

DESCRIPTION OF VARIOUS AND PREFERRED EMBODIMENTS

Figure 1:
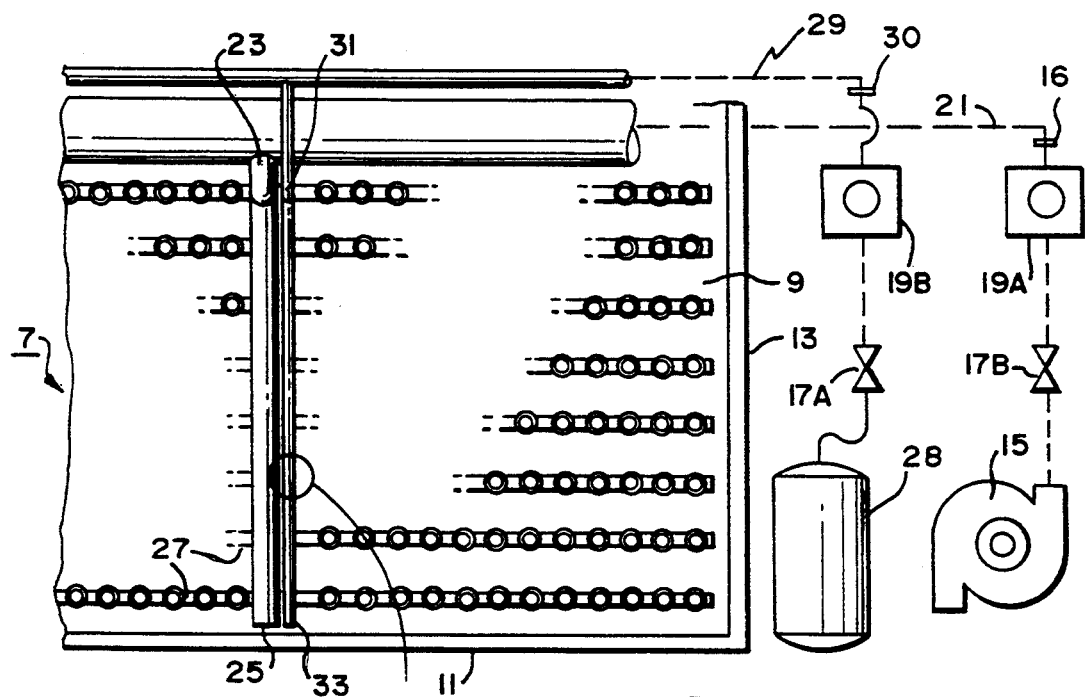
FIG. 1 is a schematic diagram including a fragmentary view of a sewage aeration system including a cleaning fluid system with conduits defining cleaning fluid channels to pass cleaning fluid to said plenums and a aeration gas supply system including conduits defining aeration gas channels separate from said cleaning gas channels to conduct aeration gas to said plenums and thence to the elements.
Figure 1A:
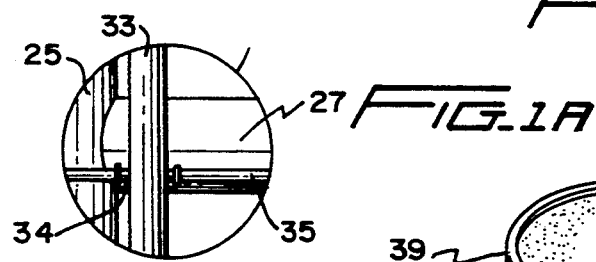
FIG. 1A is an enlargement of FIG. 1 to show the conduits in greater detail.

The invention may be employed in the aeration of waters with negligible to substantial amounts of dissolved and/or suspended solids, such as slurries or sludges. For example, the invention may be applied to waters which, after aeration, will be employed as drinking water, as industrial process water or for other uses. However, the principal applications of the invention are expected to be the aeration of various forms of wastewaters, including both domestic and industrial wastewaters, such as those resulting from chemical and "food" processing, the latter including for example agricultural, canning, brewery and slaughterhouse applications. The preferred application of the invention is in connection with activated sludge processing of mixed liquors, combinations of return sludge and incoming domestic wastewater which may include minor proportions of industrial waste. However, the invention may be employed with virtually any form of wastewater.

The aeration may be conducted, and therefore the water impounds of the apparatus of the invention may include, virtually any natural or manmade passage or partial enclosure, such as a lake, river, or lagoon, and preferably a tank. Typically, the water impounds involved in the invention will include "wall means" including at least a bottom "wall" but the term "wall" is used here in a broad sense to include any sort of underlying and at least partially surrounding containment surface or barrier, whether of earth, asphalt, plastic, concrete, metal or other material. The bottom wall may have any shape (including configuration), such as flat, dished, ridge and furrow or any other regular or irregular shape. The impound may also have side walls which may for instance be slanted but are preferably upright. Impounds having either distinct sections within a given tank or plural tanks to provide varying conditions of treatment, such as varying oxygen contents in the wastewater, including anoxic zones where desired, may be employed. The most preferred form of water impound is a concrete tank equipped for biological treatment of domestic and/or industrial wastewater by a purification process which involves biological treatment.

For purposes of the present invention, an aeration gas channel is any reasonably durable and substantially leak-proof system of conduit and/or other devices for conveying aeration gas in sufficient quantities from a source of such gas to the diffusers in a submerged portion of a water impound. The aeration gas to be conveyed by such channel may be any gas (including true gases, vapors and mists entrained in gases), suitable for supplying oxygen to the water and/or its contents. Examples include oxygen, oxygen containing gases such as air and oxygen- or ozone-enriched air and gases which react to release oxygen. Suitable sources of such gases are, typically, compressors or blowers which draw air through a filter system from the atmosphere. However, where necessary or desirable, at least a portion of the aeration gas may be drawn from a tank or a reactor, such as a source of oxygen, an ozone generator or a source of other gases.

While the aeration gas channel will most typically be constructed with various types of conduit, the channel may include or communicate with various other devices to assist with the primary function or selected other functions to be performed by the aeration gas channel. Such conduit may vary from rigid to flexible conduit if properly supported. Any suitable material of construction may be used to fabricate the conduit, including resin, concrete, metal or other materials. Circular, rectangular or other cross-sections may be employed as desired.

As viewed in plan view, the conduit of the aeration gas channel may be laid out in any suitable plan, pattern or layout. Typical and preferred layouts include multiple lines of conduit laid out substantially parallel to one another in order to feed aeration gas to diffusers. Such parallel lengths may for example be arranged in elongated rectangular tanks with most of the parallel lines of conduit running either cross-wise or lengthwise with respect to the long dimensions of the tanks. There will be a certain lateral spacing between the parallel lines of conduit, which is at least partly based on the number of diffusers which will be used. Within a given portion of the horizontal plan view of the tank, the parallel lines of conduit may be spaced apart by like distances. Elsewhere in the tank, different or variable spacings may be employed, especially where lesser amounts of aeration gas, and therefore diffusers, are required. When employing tanks that are circular in plan view, the lines of conduit may be laid out in a radial pattern or in concentric circles of successively increasing circumference.

As viewed in elevation, the conduit of the aeration gas channel may be at different elevations relative to the floor of the water impound. For example, the conduit may be installed in, on or above the floor or a combination of the foregoing. While it is possible to position the majority of the conduit above the wastewater surface, it is preferred to have the majority of such conduit submerged in the wastewater above but relatively near the floor of the water impound. While it is generally preferred that the aeration gas channel include substantially horizontal portions to support diffusers, such channel may also have significant portions of the conduit in non-horizontal orientations. For example, there may be downcomer pipes to carry aeration gas from above the water surface to horizontal manifold and distribution pipes near the water impound floor. Persons skilled in the art are aware of and knowledgeable with respect to the fabrication and installation of various types of accessory hardware employed with aeration gas channels, including for example various types of supports. These include not only swing mounts, which supply aeration gas to submerged diffusers and permit raising the diffusers out of the water for servicing, but also fixed mounts. The latter include various forms of brackets and stands which may be anchored to the walls of a tank, including the walls and/or the floor and preferably mainly the latter. Persons skilled in the art are also skilled in applying various forms of couplings, expansion joints, gas flow control valves, and the like. Also, it is known to provide such channels with valve controlled outlets useful for purging water from low points in the system.

The preferred aeration gas channel for the present invention employs rigid plastic conduit, such as PVC (polyvinylchloride), having a circular cross-section of about 4" diameter mounted within about 18 inches above the concrete floor of an aeration tank on fixed floor-mounted brackets or stands laid out in what is referred to by those skilled in the art as a grid pattern comprising vertical downcomers to supply aeration gas to horizontal manifold pipes which in turn direct the aeration gas into groups of parallel and horizontal distribution pipes on which diffusers are mounted.

Many types of fine pore diffusers are potentially useful for practicing the invention. A partial listing and a number of specific examples of such devices are provided in the Design Manual for Fine Pore Aeration Systems published by the United States Environmental Protection Agency Center for Environmental Research Information, Publication No. EPA/625/1-89/023, Cincinnati, Ohio, September 1989, pages 2 et seq. Included in the non-exhaustive listing in this publication are diffusers in which the diffusion elements are: porous ceramic plates, discs, domes and tubes; rigid porous plastic plates, discs and tubes; non-rigid porous plastic tubes; and perforated membranes in the form of tubes, discs and rectangular sheets. Each of these is available with "fine pores" which are suitable for discharging gas into water to create fine gas bubbles therein.

By way of illustration, typical bubbles generated by fine pore diffusers range in size up to about 0.2 inches (5 millimeters) or less when discharged from a new or thoroughly clean diffuser in clean water at a gas flow rate of two standard cubic feet per minute per square foot of active gas discharge surface of the diffuser. However, it should be understood that the bubble size may increase with increasing flow of gas through the diffuser. Also by way of illustration, a typical surface tension head loss for a fine pore diffuser is about two inches of water gauge or more.

On the other hand, it should be understood that the practice of the present invention is not limited to fine pore diffusers that are currently available in this advancing technology, nor to those strictly complying with the above characteristics. Rather, the invention is concerned with present and future devices having pores sufficiently fine to be relatively efficient aerators and also having susceptibility to significant fouling and reasonably successful in situ fluid cleaning.

It is the diffusion element which is primarily responsible for the bubble producing function of a fine pore diffuser. Without any intention of limiting the foregoing description of fine pore diffusers useful in the practice of the invention, we provide below a discussion of some of the characteristics of diffusion elements which are common to the diffusion elements and diffusers which are most popular in current day practice.

Such diffusion elements typically include an apertured wall which may be of ceramic, polymeric or other material. Inorganic and organic polymers, including natural and/or synthetic polymers in resinous, elastomeric or other forms, are among those which may be used to fabricate the apertured walls in any suitable shape.

While fine pore diffusion elements of virtually any shape may be employed when practicing the invention, the most popular fine pore diffusion elements in present day practice appear to be those which are plate- or disc-shaped. In plan view, these typically exhibit rounded (including circular), square or rectangular outlines. The tops and bottoms of plate or disk diffusers, when viewed in vertical cross-section, are generally horizontal, which include both flat and non-flat surfaces. Among the non-flat generally horizontal surfaces that are known are those characteristic of the center and boundary treatments disclosed in U.S. Pat. Nos. 4,261,932 and 4,261,933, both to Ewing et al and assigned to WPCC (Water Pollution Control Corp. of Milwaukee, Wis.), the assignee of the present patent.

When viewed in vertical cross-section, the peripheries of such plate or disc shaped diffusers may include stepped edges. Such edges may for example be the result of an edge permeability treatment, such as shown in Ewing et al U.S. Pat. No. 4,288,395, also assigned to WPCC, or in Veeder's U.S. Pat. No. 4,046,845, which respectively show the stepped portion of the element periphery underlying or overlying a sealing member intended to provide a gas tight seal between the element and its plenum.

However, it should be understood that no permeability treatment of the above-described type is required either in the center, boundary or peripheral portions of the diffusion element. Thus, elements with non-stepped edges may be readily employed. This includes plain-edged elements and those with peripheral features other than stepped edges, including for instance the integral sealing rings included in the peripheries of certain types of membrane diffusers. A wide variety of forms of integral seals may be included in the applicable diffusion elements, whether the latter are of the membrane type or not.

Another form of diffusion element which has enjoyed considerable popularity in the past and which is still used in some locations today is the dome-type diffusion element. Introduced in the U.K. in a four inch diameter version which was used in the 1940s and early 1950s, the domes were redesigned in a seven inch version in the mid 1950s which was eventually employed in many countries throughout the world by the 1970s. These diffusers are shown for example in Coombs' U.S. Pat. No. 2,639,131 and Branton's U.S. Pat. No. 3,532,272.

Still another form of diffusion element which was popular in the past is the porous tube type. It enjoyed its widest use before the dome diffuser reached its zenith of popularity. Porous tubes are discussed in Miles Lamb's article, "Designing and Maintaining Porous Tube Diffusers," *Wastes Engineering*, September, 1954, pp. 405–410 and 413. At one time these diffusers were made mainly of porous carbon, then porous ceramic and eventually porous plastic including wound saran cord) material. As shown by the above-mentioned 1989 EPA Design Manual, various forms of ceramic, rigid porous plastic, perforated membrane and non-rigid porous plastic tube diffusers are still in use today, but these are to be distinguished from the fundamentally different tubing type diffusers of AB Marketech, Hinde and other manufacturers.

Contemporary diffusion elements, irrespective of their shape, generally include some form of gas transmission passages through their walls. The passages may be formed in different ways. For example, formation of the passages may be inherent in the method of formation of the wall. By way of illustration, when the wall of a diffusion element is formed by sintering a compact formed from compressed grains of ceramic or plastic material, the particle size and amount of compression are controlled so that the grains are not fully compacted in the resultant part. Thus, there remains a void volume within the part which defines passageways leading from one surface of the wall through the interior of the part to its other surface. This void volume provides a myriad of passages of very small dimensions which have been produced as an inherent feature of the production of the element wall.

However, formation of the wall and formation of the passages through the wall may constitute separate steps. For example, the passages may be formed subsequent to wall formation, which is typical of the production of membrane type diffusers. A membrane diffuser is typically a sheet or tube of elastomeric material which, when initially produced, is relatively free of apertures that would be suitable for the transmission of aeration gas. After formation of the elastomer into round, square, rectangular or tubular shape, the shaped part is perforated, such as by laser treatment or, more commonly, with ganged cutting knives, to produce gas transmission passages and their associated discharge ports.

The foregoing illustrations should be sufficient to demonstrate that the gas passages extending through the walls of fine pore diffusion elements may be arranged in a random or regular manner and may pass relatively directly or relatively indirectly from one surface of the wall to its opposite surface. Also, it should be apparent that the shape of the gas passages can vary widely. They may be branched or unbranched, regular or irregular, and straight or tortuous in elevation and circular or non-circular in cross-section. There is also considerable room for variation in the shape of the gas passage outlets at the gas discharge surface of the diffusion element. Regular or irregular, open or openable and circular or non-circular shapes are a few examples of suitable shades.

In general, the applicable diffusion elements will have a gas discharge surface with sufficient active gas discharge area and a sufficient number of active gas discharge outlets distributed over that area, so that the element may be described as an "area-release" element. For purposes of the present invention, an area-release type element is one which has a rather substantial active gas discharge area, for example, at least about 20, more preferably at least about 30, and still more preferably at least about 40 square inches, in which there are many gas discharge outlets distributed randomly or regularly throughout most if not all of the area. On average, it is preferred that there should be a plurality of active or working gas discharge passage outlets or ports per square inch of active gas discharge area. If the element is an MPDE (multi-pore diffusion element) of the type described in U.S. Pat. No. 4,382,867, the gas discharge area of the element may also include inactive outlets which are capable of commencing discharge of gas as element condition and operating conditions change.

The outlets, whether active or inactive, are preferably distributed over substantially the entire, or at least the major portion of, the available gas discharge surface, and in a patterned or irregular fashion.

Gas handling characteristics of fine pore diffusers may for example be expressed in terms of DWP (dynamic wet pressure) or BRV (bubble release vacuum) For explanations of DWP and BRV, see the definitions below. In general, DWP is the preferred basis for characterizing these elements and their degree of fouling, due to the fact that the amount of DWP field data available is believed Larger than the amount of BRV field data that is available. However, BRV may be the only basis for quantifying certain types of fouling, such as the formation of biofilms.

At present, it appears that the applicable fine pore diffusion elements will exhibit a DWP in the range of about 3 to about 20, typically about 4 to about 12 and preferably about 5 to about 10 inches of water gauge when discharging air at a flow rate of 2 SCFM per square foot of active gas discharge surface of the diffuser. Similarly, it appears that the applicable elements will generally exhibit a BRV of about 2 to about 15, more typically about 3 to about 9 and preferably about 5 to about 8 inches of water gauge when discharging air into a BRV test probe with an 0.175 inch internal cross-section at a flow rate of about 0.0019 SCFM. The foregoing DWP and BRV values assume that the elements are tested in clear water with the element in a thoroughly clean and preferably new condition.

The most preferred fine pore diffusion element for use in practicing the present invention is the commercially available SANITAIRE (TM) diffuser with a ceramic disc MPDE of the type described in U.S. Pat. No. 4,382,867, fabricated by forming and sintering a compact of ceramic granules and glassy binder to produce a 7 or 9 inch diameter by ¾ inch thick element having the center, boundary and peripheral edge treatments described in said patent and in the other Ewing et al patents identified above. The passages resulting from the void volume within the element have branched, irregular and tortuous shapes with non-circular cross-sections. The outlets of these passages at the gas discharge surface of the elements are open, non-circular and irregularly shaped and are distributed irregularly and randomly over substantially the entire upper surface of the element.

Under the DWP, BRV and permeability test conditions described above and in the above-mentioned U.S. Pat. No. 4,382,867, the preferred fine pore diffusers exhibit a DWP of about 5 to about 8, a BRV of about 5 to about 8 and a permeability of about 15 to about 30. The current design flux rate range for these diffusers is in the range of about 1.25 to about 7.5 SCFM per square foot of active gas discharge surface, and most applications at present are designed with a flux rate of about 3 SCFM/ft$^2$.

In the preferred diffusion elements, the coefficient of variation of BRV across the gas discharge surface is not greater than about 0.25, based on the values of BRV measurements on ten sampling areas of equal area on the gas discharge surface of the element and through the center thereof. These areas may for example be defined by imposing a grid of squares over the area and testing at the centers of the squares so that the test points are spaced apart from one another in both of two different directions. Preferably, the coefficient of variation is less than about 0.15, more preferably less than about 0.05 and still more preferably less than about 0.02.

For purposes of the present invention, a plenum is a gas space within a diffuser which affords opportunity for reasonably uniform distribution of gas to the inlets of the gas discharge passages through the walls of the diffusion elements. As employed herein, the term plenum includes not only permanently existing spaces defined by plenum walls and internal surfaces of diffusers having rigid diffusion elements, but also the temporary gas distribution spaces defined by rigid support members and the internal surfaces of the distended elastomeric diffusion elements of certain membrane diffusers. While certain of these diffusers are configured in such a way that the membranes collapse against their holders in the absence of gas pressure, in which condition there may be no gas space present which is identifiable as a plenum, the membranes also expand away from their supports under gas pressure to provide a temporarily existing plenum during gas flow.

As shown in the above-mentioned EPA report, plenums may be positioned in or above the floor of the water impound, and will typically include sealing means and retaining means familiar to those skilled in the art for the purpose of securing the diffusion elements in substantially leak-proof relationship with the plenums. In a preferred embodiment, each diffusion element has its own individual plenum and the plenums are supported upon, and positioned at spaced intervals along, the horizontal portions of conduits included in the aeration gas channel. Several illustrative types of plenums are disclosed in Ewing et al U.S. Pat. No. 4,288,394, assigned to WPCC, a particularly preferred form of plenum being shown in FIG. 11 herein. It includes an arcuate bottom wall which conforms to the arcuate upper surface of the aeration gas conduit. The plenum bottom wall is formed as an integral part of a PVC casting, which also includes conically configured side walls, a peripheral supporting shelf for the element and a side wall with threads for a retaining ring, all of which are described in greater detail below.

In the practice of the present invention, a "flow regulator" is a device which controls the rate of flow of fluid, including aeration gas and/or cleaning fluid, into a diffuser. Preferably, the flow regulators are associated with diffusers having plenums, and the flow regulators are preferably the means through which the aeration gas and/or cleaning fluid gain entry to the plenums.

Generally, a flow regulator comprises at least one flow control orifice of determinate flow cross-section. The flow cross-section of a regulator is the aggregate cross-section of the flow of fluid through the orifice or orifices which it includes, during operation of the aeration gas or cleaning fluid channel with which the regulator is in operation.

The flow regulator may be a passive device with a fixed flow cross-section or may be an active device with a variable flow cross-section. For example, a flow regulator may be a passive device as simple as a single fixed orifice of appropriate size or a plurality of such orifices. Moreover, the flow regulators may include or be combined with valving means when it is desired that the flow regulator perform a back-flow preventing function. A particularly preferred active flow regulator which includes valving means is the "duck-bill" type illustrated in FIG. 11 herein.

Orifice flow cross-sections are selected in such a way that the pressure drops through the regulators will be substantially greater factors than the pressure drops across individual diffusion elements in determining the rates at which aeration gas and/or cleaning fluid are distributed among the diffuser plenums. Persons skilled in the art are able to design and install flow regulators able to distribute flows of aeration gas and/or cleaning fluid among multiple plenums so that the flow rate to a given plenum and its diffusion element will be substantially the same as the flow rate of such gas and/or fluid to the other plenum or plenums connected to the same aeration gas channel and/or cleaning fluid channel.

A variety of active and passive flow regulators, with and without back-flow preventing means, are illustrated in FIGS. 5 through 5D of U.S. Pat. No. 4,384,867. The standard plug orifice disclosed in FIGS. 3 through 5 of said patent and FIGS. 3 and 6 herein is considered suitable for use as a flow regulator for aeration gas in the present invention. However, in the plenums of WPCC's commercial diffuser products, orifices in the form of simple holes drilled through the saddle-shaped bottom walls of the plenums and through the adjoining walls of the aeration gas channel conduits near the lowest points on said bottom walls, have proven quite satisfactory. One-way orifices are preferred for use as aeration gas and cleaning fluid flow regulators in the present invention. However, various other forms of flow regulators are known to, or can be devised by, those skilled in the art, and may be employed in practicing the invention.

From the foregoing discussion and from the examples of flow regulators found in U.S. Pat. No. 4,384,867, it should be apparent that the elevation of the opening through which a flow regulator discharges fluid into the interior of a plenum may vary. Thus, for example, when a plug orifice is employed as an aeration gas flow regulator, the discharge opening may for example be elevated above the plenum floor. If the plenum has an arcuate floor with a crown, the discharge opening may be at or near the elevation of the crown. Also, the flow regulator discharge opening can be at the low point of a saddle-shaped plenum floor.

A one-way aeration gas flow regulator having its gas discharge opening at (including in, on or near) or above the crown of a saddle-shaped plenum floor is considered best at resisting both back-flow of water from the water impound through the diffusion element into the plenum and drain back of cleaning liquid from the plenum into the aeration gas channel. On the other hand, a simple orifice at the crown will generally have a small enough cross-section to substantially impede such back-flow and drain-back. Other advantages of the simple orifice, when located at a low point in the plenum, include good capabilities for aspirating liquid from the plenum, including both condensate and cleaning liquid. Because the simple orifice is most economical, it may be considered best overall for some applications.

Virtually from the beginning of in-situ gas cleaning of aeration systems in the 1930s, it has been standard practice to direct cleaning fluid to diffusers through the same channel which supplies them with aeration gas. For this reason it was perhaps quite natural that when in-situ liquid cleaning of diffusers was described by Cummings, Jr. in U.S. Pat. No. 5,051,193, the aeration gas channel was chosen as a path for delivering cleaning liquid to the diffusers.

Unlike prior aeration apparatus and processes embodying in-situ diffuser cleaning, the present invention employs a dedicated cleaning fluid channel. This channel differs from that described in certain prior art, such as U.S. Pat. No. 4,634,312 to Sterzel, which is not related to aeration gas channels or diffusers. Contrary to prior teachings in the art pertaining to in-situ cleaning of diffusion elements of aeration systems, the present invention has demonstrated the advantages of an aeration system having separate aeration gas and cleaning fluid channels. A number of such advantages accrue where the cleaning fluid is a liquid, and the resultant system has the further advantage that it is also useful for gas cleaning of the diffusers.

A cleaning fluid channel, in the context of this invention, is any reasonably durable and substantially leak-proof system of conduit and/or other devices for conveying cleaning fluid in sufficient quantities from a source of such fluid substantially directly to the diffusers in a submerged portion of a water impound. The cleaning fluid to be conveyed by such channel may be any liquid or gas (including true gases, vapors and liquid droplets entrained in gases) which is suitable for in-situ cleaning of the diffusion elements of fine pore diffusers.

While it is an advantage of the invention that it makes possible the creation of in-situ cleaning systems capable of applying gaseous and/or liquid cleaning fluids to diffusers, not every embodiment of the invention must necessarily be capable of operating with both liquid and gaseous cleaning agents. Thus, it is within the spirit of the invention to build and operate apparatus or conduct processes in systems incapable of applying both cleaning gas and cleaning liquid. Nevertheless the preferred apparatus, processes and methods of the present invention are those which have the capability of employing any suitable cleaning fluid, whether liquid and/or gaseous.

Suitable examples of cleaning gases include one or more gaseous (including vaporized) organic and/or inorganic solvent compounds or mixtures of solvent compounds including those compounds capable of existing as liquids and those capable of existing as gases at 20° C. and standard atmospheric pressure. Examples include $H_2O_2$, $CH_3OH$, $CH_3COCH_3$ and other volatile organic solvents. But the preferred cleaning gases are those which exist as gases at 20° C. and which give an acid reaction when dissolved in water, such as for example, $SO_2$, $SO_3$, $CO_2$, $Cl_2$, $ClO_2$, $HCl$, $NO_x$, $O_3$, $Br_2$, and the like, HCl being particularly preferred. While formic acid is a liquid under normal ambient conditions, like other liquid acids it can be formed into a mist, entrained in a flow of gas and conducted in minute gaseous dispersion to the diffusion elements. In such circumstances, the mixture of gas and dispersed particles of liquid acid qualify as cleaning gas for purposes of the invention.

A number of the acid gases mentioned above are readily soluble in water and thus form liquid acids which are quite suitable as liquid cleaning fluids. Among these are $SO_3$, $HCl$, $NO_x$ and $Br_2$, HCl being the preferred liquid acid. However, the cleaning liquids used in the invention are not limited to acids. For example, aqueous solutions of $NH_3$, of basic mixtures of $NH_3$ and $Cl_2$ and of detergents may be employed for the cleaning of some diffusers, for example the membrane diffusers. The above is not to be considered an exhaustive listing of applicable cleaning fluids, since those skilled in the art will readily identify or develop additional or new suitable cleaning fluids.

Any suitable source of cleaning fluid may be employed. For example, in the case of cleaning gas, the cleaning fluid source may be a commercial gas cylinder connected through appropriate accessory equipment including, for example, a pressure regulator, automatic shut-off valves and other safety equipment, a flow measuring device and any other necessary or desirable components familiar to those skilled in the art. In the alternative, the cleaning fluid source may be a reactor situated adjacent the water impound, such as a vessel for admixing sulfuric acid and sodium chloride and collecting the hydrogen chloride gas generated by the resulting reaction. An illustrative source of cleaning liquid is a tank of liquid formic acid or liquid hydrochloride acid connected with a pump to transfer the liquid acid from the tank into the cleaning fluid channel. Yet another example is the combination of a commercial gas cylinder containing acid gas and connected through appropriate accessory equipment including, for example, a pressure regulator, shut-off valve and conduit with a vessel for mixing the gas with water to form liquid acid, from which vessel the liquid is pumped into the cleaning fluid channel. Cleaning fluid may also be formed by reaction of components within the piping system or diffusers. For example, one component could be sent to the diffuser plenums via the aeration gas channel and the other via the cleaning gas channel. Alternatively, the components could be supplied separately, but in sequence, through the same channel.

Cleaning fluid channel parts are preferably constructed of materials resistant to the cleaning fluid to be used, and are preferably of acid-resistant materials. Particularly preferred for this purpose are conduits formed of synthetic polymeric material including both rigid and non-rigid resinous materials and elastomers. PVC has been demonstrated to have the requisite desired acid resistance, but persons skilled in the art will readily supply alternative materials.

It will seldom be necessary for cleaning fluid channels to handle the same volumes of fluid as the aeration gas channels. Thus, the internal cross-sectional areas of the cleaning fluid channels may be substantially smaller than the corresponding areas of the aeration gas channels. This affords opportunities to mount the conduits of the cleaning fluid channels either within or without the aeration gas channel conduits, as will be shown in greater detail below. Whether the cleaning fluid conduits are mounted inside or outside the aeration gas conduits, it is preferred that the cleaning fluid conduits co-extend with substantially the entire portion of the length of the aeration gas conduits which support the diffusers.

Cleaning fluid from a suitable source is conducted by the cleaning fluid channel along a flow path separated from that of the aeration gas, so that the cleaning fluid may be introduced substantially direct to the diffusers. Thus, for example, the cleaning fluid channel may discharge the cleaning fluid at (including in, or near) the diffuser aeration gas inlet.

Especially with gaseous cleaning fluid, if it is intended that aeration gas will always be flowing at a substantial rate during introduction of cleaning gas, the aeration gas channel can be arranged to discharge the cleaning gas into the aeration gas channel a short distance upstream of the diffuser aeration gas inlets or in the diffuser aeration gas inlets, upstream of any flow regulator which may be present. With the cleaning fluid channel gas discharge being positioned closely adjacent to the diffuser aeration gas inlet, the aeration gas flow will readily sweep the cleaning gas into the diffuser, thus accomplishing substantially direct delivery of the cleaning fluid to the diffuser.

However, for both gaseous and liquid cleaning fluids, whether or not aeration gas will be flowing during application of cleaning fluid, it is preferred that the cleaning gas channel have its discharge means arranged to release cleaning fluid substantially entirely within the diffusers. This causes initial contact of aeration gas and cleaning fluid to occur within the diffusers. More preferably, such release and initial contact will take place downstream of any aeration gas flow regulating means which may be present in the diffusers, and still more preferably in the diffuser plenums, when such are provided.

New variations on prior in-situ cleaning processes are made possible by the present invention. Several non-limiting examples, which we respectively refer to as direct delivery gas cleaning, direct delivery liquid cleaning and direct delivery liquid cleaning with continuing aeration gas flow, are described below.

In direct delivery gas cleaning, cleaning fluid is conveyed directly to the diffusers rather than through the aeration gas channel, but the process may in other respects be conducted in a manner quite similar to the teachings of Schmit et al U.S. Pat. No. 4,382,867. For example, the equipment utilized in direct delivery gas cleaning may be and preferably is largely similar to that disclosed in the Schmit et al patent except for the limited modifications disclosed herein. These modifications require the use of extra conduit for the cleaning fluid, but permit a wider choice of materials for the aeration gas channel, make it more convenient or less costly to install gas cleaning in an existing aeration plant with stainless steel or other metal aeration gas channels and affords greater versatility than previous gas cleaning systems, in that the modified equipment can be made suitable to perform both gas and liquid cleaning, giving the plant operator a correspondingly wider choice of maintenance options.

It is believed that direct delivery gas cleaning, as well as the direct delivery liquid cleaning to be described below, will perform to best advantage against what the above-identified EPA 1989 Fine Pore Aeration Systems Design Manual refers to as Type 1 fouling. As shown by page 41 of the Manual, Type 1 fouling comprises inorganic materials which clog the diffuser pores at the influent and/or effluent surfaces of the elements, while Type 2 fouling comprises mainly organic material such as bio-films which form on the effluent surfaces. In the aeration of mixed liquors in the activated sludge process, both types of fouling can appear on the same diffusers.

For reasons explained in the Manual, it appears that when fouling is predominantly of Type 1, the earliest stages of fouling may actually improve uniformity of distribution of air discharge over the surfaces of individual elements, with consequent improvement of OTE (oxygen transfer efficiency). Thus, when applying the present invention in this situation, the best results may be obtained by deferring cleaning until the increased power costs resulting from increased DWP have overcome the benefits of such OTE improvement. Thus, for example, cleaning may be conducted intermittently and deferred until after DWP had increased by at least about 5 inches of water gauge above the diffusion element base condition, e.g. its DWP when new or last thoroughly cleaned. However, neither deferring cleaning in this manner or the attainment of OTE improvement are required in the practice of the present invention. It is also preferred that cleaning be conducted in such a way or with such frequency to restrict the increase of DWP over the base condition, if any, to about 15 inches of water gauge or less. However, the invention is not limited to operations within this 15 inch range.

It does not appear that the bio-films of Type 2 have a beneficial effect on OTE, and may be deleterious to OTE from their onset. Thus, it is preferred not to delay cleaning when dealing with foulants predominantly of Type 2. Because such foulants appear to reduce the surface tension of the bubbles at the element effluent surfaces, such foulants may actually reduce DWP to some extent or for some period of time. In such circumstances, BRV may be a more dependable measure of fouling, and it may be best to clean with sufficient frequency to prevent any substantial accretion of bio-films on the element surfaces. This may therefore involve cleaning when the DWP of the elements has decreased, remained at zero or increased to a value in the range of up to about 5 inches of water gauge.

Direct delivery gas cleaning may be performed with proportions of aeration gas and cleaning gas similar to those used in the Schmit et al patent, with or without added water vapor. This includes the use of the Schmit et al teachings of enhancing aeration gas flow during application of cleaning gas. For example, if the normal or usual aeration gas flow for a given season and time of day were about 3 SCFM per square foot of diffuser gas discharge area, the aeration gas rate might be increased to 4 or more SCFM per square foot during application of cleaning gas. However, it is also contemplated that the rate of aeration gas flow could be reduced substantially below 3 SCFM per square foot during application of cleaning gas, such as to afford increased contact time between the cleaning gas and the foulants in the diffusion element.

At least about 0.05 and more preferably at least about 0.1 pounds of cleaning gas per diffuser will suffice for cleaning diffusers. It appears that the present invention can in certain circumstances be practiced with smaller quantities of cleaning fluid would be required by the method taught in the above-mentioned 1983 Schmit et al gas cleaning patent. In certain plants and under certain climatic conditions, aeration gas channels may contain substantial amounts of liquid water condensate, which may absorb the initial portion of the flow of cleaning gas and hold it in solution while subsequent portions of the cleaning gas flow continue to the diffusers and clean the elements. After the introduction of cleaning gas into the aeration gas channel is discontinued, the dissolved acid gas will be stripped from the condensate and will pass through the diffusers, but will afford little benefit if the diffusers are already substantially clean. Direct delivery of cleaning fluid to the diffusers avoids the holdup of cleaning gas in condensate in the aeration gas channel, so that all of the cleaning gas may be applied to the elements during the cleaning operation.

There is another way of saving cleaning gas in direct delivery gas cleaning which does not depend upon the presence of condensate in the aeration gas channel. When gas cleaning according to the Schmit et al patent is substantially complete, the aeration gas channel may still contain cleaning gas. If the diffusion elements are substantially clean at this point, the subsequent passage of this residual cleaning gas through the diffusers will be of little or no significant benefit. This form of consumption of cleaning gas does not occur in the direct delivery gas cleaning method.

Although direct delivery gas cleaning may require somewhat less cleaning gas than is recommended in the Schmit et al patent, determining the optimum proportions to use in the direct delivery method should not be difficult. Persons skilled in the art should be able to determine the optimum proportions through reasonable experimentation, starting with the recommendations contained in the Schmit et al patent.

The flow of cleaning gas from the diffusers into the aeration gas channel is not necessarily excluded from direct delivery gas cleaning, considered in its broadest context. In fact, the cleaning fluid concentration in the aeration gas channel may be significant if there is little or no aeration gas flow during application of cleaning gas and there is no effective barrier against the flow of cleaning gas at the diffuser element inlet, such as if there were no one-way valves at the aeration gas inlets of the diffusers or if the diffusers had flow regulators with particularly large orifices.

However, it is preferred to conduct direct delivery gas cleaning in such a way that the concentration of cleaning gas in the aeration gas channel is substantially less than in the practice of the Schmit et al patent. Thus, in the direct delivery method, the cleaning gas concentration in the aeration gas channel is preferably substantially less than the cleaning gas concentration in the diffusers or less than in the diffuser plenums, where such are employed. Thus, it is preferred to substantially restrict the flow of cleaning fluid into the aeration gas channel, such as by maintaining a sufficient amount of flow of aeration gas from the aeration gas channel into the diffuser, or by employing an aeration gas flow regulator with a sufficiently small orifice to substantially restrict flow of cleaning gas from the diffuser into the aeration gas channel.

It is particularly preferred to substantially exclude cleaning gas from the aeration gas channel when practicing direct delivery gas cleaning. This can be accomplished by a substantial flow of aeration gas into the diffuser, which will include any amount of flow of aeration gas that is sufficient to substantially exclude cleaning fluid from the aeration gas channel which may include either enhanced or reduced flow of aeration gas as described above. Substantial exclusion of cleaning gas from the aeration gas channel may also be accomplished with various devices. Examples include one-way valves at the aeration gas inlets to the diffusers and flow regulators with back-flow preventing means.

According to one embodiment of direct delivery gas cleaning, a cleaning liquid can be used to release vapors that act as a cleaning gas. This embodiment employs a plenum having a liquid reservoir which can hold one or more pools or other accumulations of a liquid having in solution an acid gas or other cleaning agent which can be stripped from the liquid by contact between the liquid and a flow of aeration gas.

This embodiment is performed in apparatus in which the plenums have aeration gas inlets positioned for bringing about intimate contact between aeration gas and the above-mentioned liquid. This may be accomplished for example in diffusers having plenums, including those with flow regulating means having their orifices above the crests of an arcuate plenum bottom wall, or at substantially the same elevation as the crests of the arcuate bottom wall or at a low point in the plenum.

Liquid flows into the plenum via the cleaning fluid channel provided by the present invention, either in a continuing or intermittent flow, including one shot or plural shot additions to provide the pool or accumulation mentioned above. The liquid level in this accumulation of cleaning fluid is maintained sufficient for bringing about mixing or other contact between the liquid and aeration gas. This may for example be accomplished by maintaining the liquid level at or above the elevation of the aeration gas inlet or inlets, or by maintaining such level below the aeration gas inlets and employing suitable deflector means to bring about the desired contact.

Although the liquid level may be intermittently high enough to fill the plenum, the plenum is preferably no more than partly full during a sufficient portion of the cleaning operation to accomplish measurable gas cleaning, e.g., to remove about 20 percent or more of the foulant present in (including on) the diffuser. More preferably, the plenum is no more than partly full during most of the cleaning operation. Most preferably, the level of the liquid is below the element influent surface at substantially all times.

A continuing flow of aeration gas is applied during cleaning. This flow aspirates or strips vapors from the reservoir of cleaning liquid. These vapors pass through the diffusion elements and clean them. While this continuing flow of aeration gas may be interrupted for periods of quiescent contact of cleaning fluid with foulants, the aeration gas preferably flows during the majority of, preferably during at least about 75% of, more preferably during at least about 90% of and most preferably substantially throughout the cleaning cycle.

In direct delivery liquid cleaning, as in direct delivery gas cleaning, the cleaning fluid is transported direct to the diffusers without traversing substantial portions of the aeration gas channel. In all other respects, direct delivery liquid cleaning is similar to the "external mixture" method of cleaning disclosed by Cummings, Jr. in U.S. Pat. No. 5,051,913.

Direct delivery liquid cleaning may be conducted in equipment which is substantially the same as that disclosed by Cummings except for the limited modifications taught herein. While direct delivery liquid cleaning requires more conduit for the cleaning fluid channel, direct delivery liquid cleaning offers advantages over Cummings that are similar to the advantages of direct delivery gas cleaning over the Schmit et al method.

Direct delivery liquid cleaning requires no more cleaning liquid than is employed by Cummings and, for reasons set forth above, less cleaning fluid should be sufficient since there is no need to fill the aeration gas channel with cleaning liquid. Persons skilled in the art will readily determine the optimum proportions of liquid cleaning agent without undue experimentation.

Flow of cleaning liquid from the diffusers into the aeration gas channel is not necessarily excluded and there may be substantial amounts of cleaning liquid in the aeration gas channel during direct delivery liquid cleaning if no effective barrier to such flow results from the design of the aeration system. However, the amount of cleaning liquid admitted to the aeration gas channel is preferably substantially less than would be present in such channel in the practice of the Cummings, Jr. external mixture method.

Thus, the practice of direct delivery liquid cleaning is not accompanied by filling the aeration gas channel full with cleaning liquid. Preferably, the cleaning liquid flow into the aeration gas channel is substantially restricted by means at the aeration gas inlets into the diffusers so that, on average, the cleaning liquid fills no more than half of the air main cross-section. This may for example be accomplished by providing the diffusers with aeration gas flow regulators with small control orifices. More preferably, cleaning liquid is substantially excluded from the aeration gas channel by the equipment, such as by a one-way valve at the diffuser aeration gas inlets or by flow regulators with back-flow preventers.

As in the Cummings, Jr. process, the plenum and diffusion element are preferably kept substantially full or flooded with liquid cleaning agent during most of the cleaning period. Direct delivery liquid cleaning can be practiced with or without quiescent periods, provided their duration is not so excessive as to seriously impair the microorganisms, if such are employed in the process, or to unacceptably reduce plant output. Thus, it is possible to force fresh cleaning liquid into the pores of the diffusion elements intermittently as taught by Cummings, Jr. However, in direct delivery liquid cleaning, the additional acid comes from the cleaning fluid channel rather than from the aeration gas channel. The foregoing techniques can be interspersed with periods of aeration gas flow, with or without bumping of the aeration gas flow, affording an opportunity for alternately cleaning and purging the elements. Bumping may for example include increasing gas flow through the diffusers from its normal rate to a substantially increased rate (e.g. 200–300% increase) for a limited period (e.g. 15–30 minutes).

In general, direct delivery liquid cleaning with continuing aeration gas flow includes filling the diffusers with a liquid cleaning agent. While the diffusers are filled or "flooded" in this manner, a flow of aeration gas is caused to pass through the diffusers and their respective elements. This flow assists in conveying cleaning liquid into and through the elements, agitating the cleaning liquid in the pores of the elements and sweeping out of the pores spent liquid, dislodged foulant or both of the above.

Flooding the diffusers includes at least partly filling or flooding the elements and filling the remaining parts of the diffusers which are accessible to the liquid, including plenums where such are provided. Flooding may be accomplished with a constant flow of liquid from the cleaning fluid channel into the diffusers. Such constant flow may be matched to the rate of discharge of cleaning liquid from the elements to maintain the elements partly or completely filled, while the remaining liquid-accessible portions of the diffusers remain flooded. If the constant flow of liquid is not matched to the discharge of cleaning liquid from the elements, such flow may for example be sufficient either to supply excess acid to the diffusers, including their elements, or to initially flood the diffusers and then supply a deficiency of liquid which will result in a gradual reduction of the liquid level in the elements.

Instead of being constant, the flow of cleaning liquid which floods the diffusers may be intermittent or pulsating. For example, such intermittent flow may be used to intermittently flood the diffusers and their elements and to intermittent lower the liquid level below the element influent surfaces. In this manner, a space may be intermittently provided between the surface of the liquid within the diffuser and the element influent surface.

Such lowering of the liquid level, depending upon its duration and the rate of flow of aeration gas, may or may not result in purging of the cleaning liquid from the elements. In pulsating operation, there may for example be a flow of cleaning liquid for an extended period, during which the flow occurs at a base rate for most of the time in the period and during which the flow at base rate is repetitively pulsed, i.e. there is flow at increasing, increased, decreasing or decreased rate(s), for relatively short portions of the period.

The amount of acid used in a given cleaning cycle will be sufficient to bring about significant cleaning of the elements, e.g., at least about a 20% reduction in the BRV or DWP increase attributable to fouling since the element was new or last cleaned. When a constant flow of cleaning liquid is employed as above described, the amount of liquid cleaning agent required is expected to be greater than in direct delivery liquid cleaning. When an intermittent flow is employed, the amount of cleaning liquid is expected to be less than in direct liquid cleaning. In any event, it is anticipated that persons skilled in the art will readily determine the amount of liquid cleaning agent to be used without undue experimentation.

The continuing flow of aeration gas employed herein is contrary to the teachings of Cummings Jr. Although the present embodiment of the invention allows for the possibility of quiescent periods (periods with no flow of aeration gas) as taught by Cummings Jr., characterization of the flow of the present embodiment as "continuing" signifies that the gas flow is substantial in amount and/or time (duration) during maintenance of flooded conditions in the diffusers.

The amount of aeration gas applied during flooding may be expressed as a percentage of the amount of aeration gas which would have been applied while operating the aeration facility at its "normal" aeration gas rate during the period of flooding with cleaning liquid. For the "normal" rate, one may use substantially that rate which would be applied in the aeration facility, if the environmental, load and/or other factors that have been applied in establishing aeration gas rate for that particular facility are applied in the same manner and to the same extent that they have been applied in the recent plant operating history (e.g. up to five years) to establish aeration gas rate when cleaning was not occurring. However, if the data for establishing the rate as above described is not readily available, or if the foregoing gas rate cannot readily be determined for other reasons, one may use as the "normal" rate the average aeration gas rate used for the four weeks immediately preceding the cleaning operation.

Based on the normal rate as above-described, the applicable percentages of normal aeration gas rate which may be applied in this embodiment of the invention include at least about 20%, more preferably at least about 40%, still more preferably at least about 60% and in some instances more than 80%. Using less than 100% or less than about 80% of the normal amount may be beneficial in conserving acid and sufficient to perform one or more of the targeted functions described below. Use of 100% of the normal amount is contemplated, and larger amounts may be used if desired.

In practicing direct delivery liquid cleaning with continuing aeration gas flow, the aeration gas is caused to flow during the majority of the time the diffusers are flooded. Preferably, the flow continues for at least about 60% of the time, more preferably at least about 75% of the time and still more preferably more than about 90% of the time. Most preferably, gas flows substantially all of the time during which the diffusers are flooded. Moreover, it should be understood that the invention includes partial or complete replacement of the aeration gas, during cleaning, with any other gas that is compatible with the system parts and cleaning operation.

The above flow amounts and durations may be used in combination with various aeration gas flow rates. More particularly, the aeration gas flow rate may be established or controlled in relation to or in conjunction with any of the above amounts or time options. Thus, the rate employed may be a rate which is normal or typical for the plant, given the prevailing load, environmental and other factors. On the other hand, an enhanced or greater than normal rate of flow may be employed, for example to produce a more intense agitation of the cleaning liquid in foulant, to maintain a substantial amount of aeration gas discharged into the water while restricting the percentage of time during which aeration gas is discharged, or for any other reason or combination of reasons. Moreover, a reduced or less than normal aeration gas rate may be employed for conserving liquid cleaning agent or for any other purpose.

In accordance with this embodiment of the invention, the amount and/or time of flow of aeration gas is selected in conjunction with the aeration gas rate for promoting or improving any one or combination of the following targeted performance factors, as compared to the levels of such factors attained in the absence of aeration gas flow. Among these factors is cleaning performance. It includes the rate and/or degree of completeness of cleaning. These are manifested respectively by the time required to reduce and by the extent of reduction of any BRV or DWP increase which is observed in the elements and is attributable to fouling of the elements since they were new or were last cleaned. The amount and/or time of aeration gas flow may also be selected to promote or improve the survival or condition of bacteria, if such are used in the aeration process. Also, if the invention is being employed as part of an activated sludge wastewater treatment process, the selection may be based on promotion or improvement of the proportion of mixed liquor solids kept in suspension, thereby substantially reducing or eliminating difficulties associated with sludge settling on diffusers, on the bottom of the water impound or both.

DETAILED DESCRIPTION OF THE DRAWINGS

FIGS. 1-12 disclose several of many possible embodiments of apparatus for aeration of wastewater with an aeration gas in accordance with the invention, as well as a related process and methods of assembly. The preferred apparatus embodiments each include a water impound, an aeration gas channel, fine pore diffusers and a cleaning fluid channel in an aeration system. As shown in the drawings, it is preferred that the aeration gas channels include substantially horizontally disposed aeration gas conduits which will be submerged in the wastewater when the diffusers are in normal operation, and that the cleaning fluid conduits run along the outsides (FIGS. 1-5) or the insides (FIGS. 6 and 7-12) of the horizontally disposed conduits to the plenums.

In the embodiment of FIGS. 1-5, the water impound is an aeration tank 7. It has wall means including a tank floor 9 with tank side wall 11 and tank end wall 13. The tank is provided for the purpose of containing a body of water or other aqueous liquid which, in this case, is mixed liquor, a mixture of wastewater and return sludge, which is to be aerated in an activated sludge process.

Serving as a source of aeration gas comprising oxygen, which in this instance is air from the atmosphere, compressor 15, valve 17b. and flow indicator 19a feed the air through an attachment, such as coupling 16, into at least one aeration gas channel. In this embodiment, there is an aeration gas channel which includes a plurality of aeration gas conduits.

Conduits included in the aeration gas channel provide a first flow path to convey aeration gas to diffusers positioned in the above-mentioned zone. The materials of which the aeration gas conduits are fabricated is chosen with due regard to their resistance to corrosion, weather, collapse and impact and such other stresses as may be exerted thereon in fabrication, assembly and use. These conduits are preferably fabricated of synthetic resinous material, such as ABS (acrylonitrile-butadiene-styrene) or preferably PVC (polyvinylchloride), and may for example include one or more air mains, downcomers, manifold conduits and distributor conduits.

For example, in this embodiment, air main 21 is generally supported above the level of mixed liquor in tank 7, and feeds air into an air downcomer pipe 23 extending vertically from air main 21 to feed horizontally disposed air manifold conduit 25 supported substantially horizontally a short distance above tank floor 9. One end of aeration gas manifold conduit 25 is connected with, indirectly, the attachment, e.g., coupling 16, by which the aeration gas channel is connected with the aeration gas source.

Parallel rows of air distributor conduits, in this case pipes 27, are also supported substantially horizontally a short distance above the tank floor 9. At least portions of these conduits extend generally horizontally within a zone comprising the lower half and bottom area of tank 7 and will be submerged in the wastewater when the tank is in normal operation. Distributor conduits 27 are fed by air manifold pipe 25, and each represents a branch of the aeration gas channel, for feeding a given set of diffusers 39 in a manner to be disclosed in greater detail below. The spacing, in a horizontal plane, of air distributor conduits 27 and diffusers 39 is determined on the basis of criteria known to persons skilled in the art.

A source of cleaning fluid, which in this embodiment includes a pressurized tank 28, as well as a valve 17a and a flow indicator feeds cleaning fluid through an inlet, such as a coupling 30, into one or more cleaning fluid channels. Tank 28 may for example contain HCl gas or liquid hydrochloric acid or any other cleaning fluid that is aggressive toward organic or inorganic foulants. In the present embodiment there is a cleaning fluid channel which includes a plurality of cleaning fluid conduits.

The conduits of the cleaning fluid channel provide a second flow path, a portion of which connects with and conveys cleaning fluid to the diffusers positioned in the above-mentioned zone. The materials of which the cleaning fluid conduits are fabricated are chosen with due regard to their resistance to corrosion, weather, collapse and impact and such other stresses as may be exerted thereon in fabrication, assembly and use. They are preferably fabricated of synthetic resins, such as PE (polyethylene), PP (polypropylene) or preferably PVC (polyvinylchloride), and may for example include one or more fluid mains, downcomer pipes, manifold conduits and distributor conduits.

By way of illustration, fluid main 29 is generally supported above the level of liquid in the tank 7, and feeds into fluid downcomer pipe 31 extending vertically from fluid main 29 to a fluid manifold pipe 33. One end of cleaning fluid manifold pipe 25 is indirectly connected with the inlet, coupling 30, by which the cleaning fluid channel is connected with the cleaning fluid source.

There is no requirement that any portion of the conduits defining the cleaning fluid channel must extend horizontally. However, it is preferred that portions of these conduits do extend generally horizontally within the above-mentioned zone of tank 7, so that they are submerged in the wastewater when the tank is in normal operation. Thus, pipe 33 is preferably supported substantially horizontally a short distance above tank floor 9. Parallel rows of fluid distributor pipes 35, also preferably supported substantially horizontally a short distance above the tank floor 9, are fed by fluid manifold pipe 33 through fluid manifold valve 34. Accordingly, in this embodiment, fluid main 29, fluid downcomer 31, fluid manifold 33 and fluid distributors 35 respectively run substantially parallel to the air main 21, air downcomer 23, air manifold 25 and air distributors 27.

Figure 2:
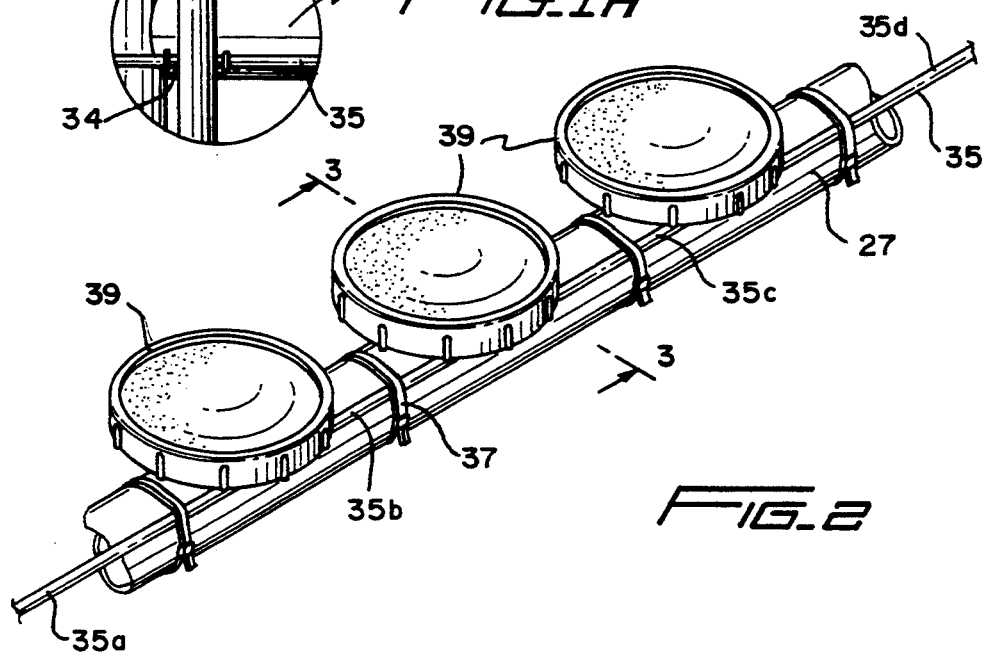
FIG. 2 is a perspective view of portions of the conduits and a portion of the diffusers shown in FIG. 1.

FIGS. 2 and 5 are respectively views in perspective and elevation of a portion of one of the air distributors 27, to which are attached diffusers 39 and fluid distributor tubing 35. Fluid distributor tubing 35 is bound to the exterior of air distributor by plastic strip rachet ties 37 and is routed past a plurality of diffusers 39 to feed cleaning fluid to them in a manner to be described in greater detail below.

As shown in FIGS. 2, 4 and 5, the cleaning fluid channel preferably includes a plurality of cleaning fluid conduit segments. For example, the distributor tubing 35 may be divided into segments 35a, 35b, 35c and 35d, which are positioned for passing cleaning fluid from a position adjacent one of said diffusers 39 to a position adjacent another of said diffusers. It is not required, but it is preferred, that these segments extend generally parallel to generally horizontally extending portions of the aeration gas conduits within the aforementioned zone, as shown in the figures. Although it is not essential that they do so, it is also preferred that these cleaning fluid conduit segments extend along the outside of and closely adjacent said generally horizontally extending portions of said aeration gas conduits within said zone, which is also shown in these drawings. Thus, this embodiment of the apparatus is capable of performing a process in which at least part of the portion of the second flow path, including that part which connects with the diffusers, is located outside a horizontally disposed portion of the first flow path.

The tubing 35 of FIGS. 2 through 5 may, as an alternative to what is shown, be a single piece of tubing, and it may be pierced by fluid taps at intervals along its length which correspond to the separation of adjacent diffusers. If such taps are connected with the interiors of the diffusers, the tubing may transmit fluid to the diffusers. Whether tubing 35 is in a single piece or is divided into segments, FIG. 2 will be capable of performing a process in which at least part of a first or aeration gas flow path is in a first conduit, e.g., the conduit 27, and in which at least part of a second or cleaning fluid flow path is in a second conduit, e.g., the tubing 35, whether the second conduit be in one piece or in several segments, such second conduit being bound to the exterior of said first conduit.

Diffusers 39 of FIG. 2 are representative of a multiplicity of fine pore diffusers included in this preferred embodiment. As illustrated in FIG. 1, the multiple diffusers may be distributed in arrays familiar to those skilled in the art and arranged in regular and varying patterns to achieve the desired distribution of air in the tank. Such arrays may for example include sets of diffusers, each set being a series of diffusers supported on a common aeration gas supply conduit. As shown in FIGS. 2 and 3, the diffusers are mounted at longitudinally spaced intervals along the lengths of, and in communication with the interiors of, the generally horizontal portions of said aeration gas conduits.

The diffusers optionally but preferably include plenums. FIG. 3 is a transverse, vertical cross-section through one of the diffusers 39 in FIG. 2, taken on section line 3—3 of FIG. 2, and shows the interior of the diffuser, including its plenum. Plenum 43 of this preferred diffuser includes surrounding wall means comprising a lower plenum wall 45 and side wall 46. Side wall 46 corresponds in shape with a portion of a cone and is preferably molded or cast integrally with lower wall 45. All or at least a substantial portion of lower wall 45 is circular in transverse cross section and much if not all of its under-surface conforms to, and is welded by ultrasonic- or preferably adhesive-welding to, the air distributor pipe outer, upper surface 47.

The upper edge of plenum side wall 46 includes means, known to those skilled in the art, for supporting a diffusion element 48. Particularly preferred arrangements for sealing and retaining such diffusion element 48 in gas-tight relationship with the interior of the plenum are described in Schmit et al U.S. Pat. No. 4,382,867. In this embodiment, the diffusion element is an MPDE (multi-pore diffusion element), but any fine pore diffusion element may be employed.

One or more gas passages provide connections between the first or aeration gas flow path and each diffuser. Through such passages, aeration gas may be introduced into the diffusers, including introduction of the gas into the diffuser plenums where such are employed, for causing discharge of the gas through the diffusion elements, thereby aerating the wastewater. The diffusion elements of the fine pore diffusers are generally subject to accumulation of foulants in and/or on the elements during such discharge, including organic or inorganic foulants and mixtures thereof.

The passage(s) through which aeration gas passes from the first or aeration gas flow path into the diffusers may be relatively large or small, with or without the ability to perform gas regulation and/or other functions. It is preferred that the flow cross-section of the passage(s) is selected to provide flow regulation, and the passage(s) may be one or more simple flow regulating orifices or parts of more complex flow regulation devices.

The flow regulating passage(s) may be located at a physical interface between an aeration gas channel conduit and the body of the diffuser or, if connected with such interface by an extension duct that is external or internal relative to the diffuser, may be located upstream or downstream of such interface. In the present preferred embodiment, aeration gas passages are provided which are part of a flow regulator, and the passages are located downstream of the flow path-diffuser interface. Thus, in this embodiment, air distributor pipe 27 has air outlet opening 41 in its top center line to feed air into plenum 43 through an air opening 49 in the lower plenum wall 45. Openings 41 and 49 and a small upstanding boss 51 on the lower plenum wall 45 seat a sleeve mount 55 for the air flow regulator 53 having a gas discharge passage 57 downstream of the flow path-diffuser interface and within the plenum 43.

One or a plurality of fluid pathways provide connections between the second or cleaning fluid flow path and each diffuser. Through such pathways, cleaning fluid may be introduced into the diffusers, including introduction into the diffuser plenums where such are employed, for causing discharge of cleaning fluid through the diffusion elements, thereby cleaning the elements.

Like the above-mentioned passages for the aeration gas, the pathway(s) through which cleaning fluid passes from the second or cleaning fluid flow path into the diffusers may be relatively large or small, with or without the ability to perform gas regulation and/or other functions. However, it is preferred that the flow cross-section of these pathway(s) should be established to provide flow regulation, and the pathway(s) may therefore be one or more simple flow regulating orifices or parts of more complex flow regulation devices. Moreover, as with the aeration gas flow regulators, the cleaning fluid flow regulating pathway(s) may be located at a physical interface between a cleaning fluid channel conduit and the body of the diffuser or, if connected with such interface by an extension duct that is external or internal relative to the diffuser, may be located upstream or, preferably, downstream of such interface.

Thus, as shown in FIG. 3A, the plenum side walls 46 have fluid inlet openings 59 into which are welded the base legs 63 of tee connectors 61 so that the outlet openings 65 of the base legs face the interior of the plenum 43. As shown in the enlarged portion of FIG. 3 as well as in FIGS. 4 and 5, fluid distributor tubing segments, such as segments 35b and 35c (see segments 35b and 35c of FIGS. 4 and 5), fit over the remaining legs defined by the body 67 of each tee connector, and are held in place by worm gear clamps 69 (see FIG. 5). Thus, in this embodiment, the outlet openings 65 of base legs 63 of tee connectors 61, located within the plenums 43, are the pathways through which the tubings 35 feed fluid to diffusers 39.

The present embodiment lends itself to fabrication techniques in which the cleaning fluid channel comprises conduit and plural tee connectors positioned at longitudinally spaced intervals along the conduit with their base legs projecting laterally from the conduit. In such methods the plenums have walls with holes that are spaced apart by substantially similar intervals and extend from the interiors of the plenums to the exteriors thereof, outside said aeration gas conduit, for receiving the base legs of the tee connectors. This makes it possible to secure a cleaning fluid channel portion to an aeration gas channel portion by securing said tee connector base legs in communication with said holes.

FIG. 6 shows an additional embodiment of the invention which is similar to that of FIGS. 1–5, except that the cleaning fluid channel is mounted within the aeration gas channel. In this embodiment, the base leg 63 of the tee connector 125 is welded in openings 127 and 129 through the air distribution pipe 27 and the lower plenum wall 45 so that the cleaning fluid discharge opening 65 faces the interior of the plenum 43. As in the previous embodiment, tubing 35 fits over the remaining legs defined by the tee connector body 67, being held in place by clamps 69 (see FIG. 5) or any other suitable means. Thus, this embodiment of the apparatus is capable of performing a process in which at least part of the portion of the second flow path, including that part which connects with the diffusers, is located inside a horizontally disposed portion of the first flow path.

Consideration of the embodiments of FIGS. 1-5 and 6 will show that the cleaning fluid conduit segments 35a-35d (see segments 35a-35d of FIG. 2) and the tee connectors 61 servicing the multiple diffusers 39 are examples of plural members, located within the above-described zone of tank 7, that respectively have substantially separate and substantially direct connections to plural diffusers, and define cleaning fluid flow paths which remain substantially separate from said aeration gas channel in those parts of said flow paths which extend from said inlet to said diffusers. Having been taught this principle of the invention, persons skilled in the art will readily develop other such members which will not necessarily be or include conduit segments and/or tee connectors as above described.

When conducting cleaning, especially under conditions in which a substantial flow of aeration gas is not maintained throughout and cleaning is performed in diffusers having plenums, it is useful if the size of the aeration gas passages from the first flow path into the diffusers is established to maintain some degree of control over back-flow of cleaning fluid from the diffusers into the aeration gas channel. Under these same conditions, it is also advantageous if the size of the cleaning fluid pathways from the second flow path into the diffusers is selected to maintain some degree of control over back-flow of cleaning fluid from the diffusers into the aeration gas channel.

Therefore, whether there be flow regulation or not, it is preferred that the aeration gas passages and/or the cleaning fluid pathways be small enough in flow cross-section so that they constitute retarding means for substantially retarding flow of cleaning fluid from said plenums into said aeration gas channel and/or into said cleaning fluid channel. This is illustrated by the embodiments of FIGS. 1-5 and 6. Optionally, with or without flow regulation, the passages and/or the pathways may be equipped with one-way valve means positioned for substantially preventing flow of cleaning fluid in the reverse direction from said plenums into said aeration gas channel and/or into said cleaning fluid channel. However, this option may be readily attained when the passages and/or pathways are respectively equipped with aeration gas flow regulating means and/or cleaning fluid flow regulating means to provide flows of aeration gas and/or cleaning fluid of controlled flow rate from the aeration gas channel and/or from the cleaning fluid channel in the direction of and into said plenums. Such aeration gas flow regulating means and/or such cleaning fluid flow regulating means may for example include one-way valve means positioned for substantially preventing flow of cleaning fluid from said plenums into said aeration gas channel means and/or into said cleaning fluid channel. When the aeration gas flow regulating means and/or cleaning fluid flow regulating means do include one-way valve means, as above described, it is preferred that the one-way valve means be positioned within the plenums. This feature, among others, will be illustrated with the embodiment of FIGS. 7-12.

FIGS. 7 through 12 show an alternate and even more preferred embodiment of the invention, having some features in common with the previous embodiments. FIG. 7 is a schematic diagram which includes a fragmentary view of a sewage aeration system that is similar to the one in FIG. 1 but has its cleaning fluid channels partially enclosed within the aeration gas channels. In this embodiment, as in the previous ones, aeration tank 7 has a tank floor 9 with tank side wall 11 and tank end wall 13 containing mixed liquor. Also in common with the previous embodiments, a source of aeration gas (not shown) is connected with an aeration gas channel including air main 21, and a source of cleaning fluid (not shown) is connected with a cleaning fluid channel including cleaning fluid main 29.

As shown in FIGS. 7 and 8, air main 21 is generally supported above the level of liquid in the tank 7, and feeds into an air downcomer pipe 23 extending vertically from air main 21 to a horizontally disposed air manifold pipe 25 supported substantially horizontally a short distance above tank floor 9. Parallel rows of air distributor pipes 130 are also supported substantially horizontally a short distance above the tank floor 9. Pipes 130 are connected to air manifold pipe 25 to receive air therefrom through fixed couplings 26 and support sets of fine pore diffusers 39.

Cleaning fluid main 29, also shown in FIG. 7, is generally supported above the level of liquid in the tank, and feeds into a fluid downcomer pipe 131 extending vertically from fluid main 29 to a horizontally disposed fluid manifold pipe 133 supported substantially horizontally a short distance above the tank floor 9 and also above air manifold pipe 25. Fluid manifold pipe 133 has outlets through fluid branch line nipples 134, flexible tubes 135 and entry joints 137. At these joints, the cleaning fluid channel enters the aeration gas channel. More particularly the cleaning fluid channel enters air distributor pipe 130 and, while providing a cleaning fluid flow path separate from the aeration gas flow path, travels within the pipe 130 to each of the multiple diffusers 39.

FIG. 9 is an exploded view of one of the entry joints 137 shown in FIG. 8. Flexible tube 135 is connected by a worm screw clamp 139 to a threaded barb fitting 141, which is screwed into an external pipe bushing 143. Bushing 143 is connected by nipple 149 through a center hole in circular plate 151 to an internal pipe bushing 153. Bushings 143 and 153 respectively abut against the upper and lower surfaces of plate 151, to which they are sealed by gaskets (not shown) or solvent welding. Plate 151 fits into the mouth of a spigot sleeve 155 having male threads formed on the exterior of its mouth portion, and is held in place by compatible female threads on the interior of retainer ring 145. An O-ring 147 compressed between the retainer ring and plate 151 provides a watertight seal between the plate and sleeve 155. This sleeve is welded to a large nipple 132 formed on the air distributor pipe 130. The internal pipe bushing 153 is screwed to the end of the fluid distributor pipe 157 within the air distributor pipe 130.

FIG. 10 shows the parts of FIG. 9 in their assembled form, as well as a continuation of fluid distributor pipe 157 which runs past the entrances to several diffusers 39 stationed along air distributor pipe 130. After flexible tube 135 conducts the second or cleaning gas flow path to entry joint 137, where said second path enters the first or aeration gas flow path by penetrating air distributor pipe 130, the second path maintains its separate identity by running through fluid distributor pipe 157 within the air distributor pipe 130. Pipes 130 and 157 are connected to each of the plenums 161 of diffusers 39 in a manner shown in greater detail in FIG. 11.

FIG. 11 is an exploded and partially cut-away portion of FIG. 10. It shows a connection between the fluid distributor pipe 157 and the plenum 161 and a connection between the gas distributor pipe 130 and the plenum 161. Such connections are replicated at each of the multiple plenums in the apparatus.

Each plenum 161 is bonded to gas distributor pipe 130 through an elastomer gasket 160 which forms a seal between them. This seal includes an adhesive bond between the gasket and the crown of the pipe and a further bond between the gasket and the plenum. In the figure, the crown of the pipe has been removed to expose the interior of pipe 130.

Through pipe 130 runs fluid distributor pipe 157, and it includes a plurality of pipe segments interspersed with plural tee joints 158 at longitudinally spaced intervals along the length of pipe 157. The longitudinal axes of the base legs 159 of these connectors are parallel to one another and project laterally from pipe 157.

A series of apertures 162 provides communication between the interior of the gas distributor pipe 130 and the interiors of plenums 161. This is accomplished by providing openings in the crown of pipe 130, in the gaskets 130 and in the bottom walls of plenums 161 which are in registry with one another. These apertures are spaced apart along the length of pipe 130 at longitudinal intervals identical to those which separate tee joint base legs 159 and are of sufficient diameter for insertion of these base legs.

Tee joint base legs 159 have threaded portions which extend upward through apertures 162 into the plenums 161, while also passing through retaining blocks 163. In the assembled part, the base legs 159 are firmly held in place in apertures 162 and the blocks 163 are drawn tight against the lower plenum wall 172 by split washers 165 and nuts 167 applied to the threaded portions of base legs 159. Several turns of the threads on base legs 159 project above nuts 167. To these turns, with the aid of internally threaded retaining caps 171, are secured elastomer duck bill flow regulators 169, which also constitute check valves.

The airways 174 from gas distributor pipe 130 into the plenums 161 are offset from the crown of the pipe. These airways comprise openings in upper portions of the walls of pipe 130 which are within the "foot-prints" of the plenum bottom walls 172, as well as registrated openings in the gaskets 160 and in the plenum bottom walls themselves. Threaded inserts 173 are solvent welded into the airways 174, and elastomer duck bill flow regulators 175 with check valves are secured to the inserts 173 by internally threaded retaining caps 177.

Subassemblies corresponding to the apparatus shown in FIGS. 9–11 may be prefabricated in a mass production facility and shipped to sites at which aeration plants are to be constructed. There the subassemblies may be united with other components of the aeration gas channel and cleaning fluid channel, such as those shown in FIGS. 7 and 8. In constructing such a plant, it will normally be desired to considerably extend the reach of the air distribution conduits to increase the number of diffusers and the floor area over which aeration gas may be distributed, especially in large tanks. For this purpose, subassemblies that are similar or modified in nature as compared to that of FIG. 10 may be connected with one other end to end in series, as will be described in connection with FIG. 12.

FIG. 12 shows a joint connecting two subassembly units 166 and 168 end to end in series, and it will be appreciated that three or more subassemblies may be connected in series with similar joints. Unit 166 has a fluid distributor pipe 157 running within an air distributor pipe 130, and unit 166 is identical to the subassembly of FIG. 10 except that its pipe 157 has a free end 170 somewhat longer than free end 164 of FIG. 10. Similarly, unit 168 has a fluid distributor pipe 178 running within an air distributor pipe 132. In other respects, the construction of unit 168 is like that of unit 166 except that coupling 26, flexible tubing 135, nipple 156 and the remainder of entry joint 137 are omitted.

Fluid distributor pipe 178 of unit 168 has at one of its ends, i.e., the end shown in FIG. 12, an elongated free end 176 similar to free end 170 of pipe 157 of unit 166. If the opposite end of unit 168 which is not shown in the figure will be connected to a third subassembly, then at that opposite end of unit 168 its fluid distributor pipe 178 will have another free end (not shown) similar to free end 176. A subassembly which terminates a series of subassemblies will be similar to subassembly 168, except that at its terminal end both the fluid distributor pipe 178 and air distributor pipe 132 will be capped.

To provide access to adjacent free ends of gas distributor pipes 157 and 178 for joining them in a manner to be described below and to accommodate expansion and contraction of mated units 166 and 168 during use, the units have expansion barrels 179 and 180. These barrels, respectively bonded to the ends of air distributor pipes 130 and 132, are of such inside diameter to receive, in a close, sliding fit, the two ends of coupling segment 185. Seals may be formed between the coupling segment ends and the barrels within which they are respectively telescoped, with the aid of lubricated O-rings 181, 182 which are held in place by threaded retainer rings 183, 184.

Anchor support 189, secured to the tank floor 9, is provided to anchor and support air distributor coupling segment 185 and the units 166 and 168 which are attached to it, thus securing the distribution system at a predetermined elevation above the tank floor 9. As is well known to those skilled in the art, it is common for such supports to include height adjusting means (only partially shown) to permit levelling of the distribution system in compensation for irregularities in tank floors. The inside diameter of the collar portion 195 of the present anchor support is such as to receive the outside diameter of coupling segment 185 in a close, sliding fit. Thus, the coupling segment 185 can slide back and forth within collar 195 and expansion barrels 179 and 180 when mating the units to each other and to the support, before the retainer rings 183, 184 are tightened.

During assembly of the joint of FIG. 12, coupling segment 185 is inserted lengthwise, moving from left to right through collar 195, retainer ring 183, and O-ring 181, into expansion barrel 179, until the right-hand end of the segment contacts interior circumferential boss 190. This leaves free end 176 of pipe 178 in unit 168 exposed. Then, flexible tubing 187 is fed into coupling segment 185 with the first or leading end of the tubing moving from left to right toward unit 166. The trailing or second end of the tubing is then secured to free end 176 of pipe 178 in unit 168, using worm screw clamp 192.

Now, coupling segment 185 is shifted longitudinally in collar 195 in the opposite direction, from right to left, moving the right-hand end of the segment out of expansion barrel 179, O-ring 181, and retainer ring 183, while introducing the segment left-hand end into retainer ring 184, O-ring 182, and expansion barrel 179. Free end 170 of pipe 157 in unit 166 is now exposed, and is secured to the first end of the tubing 187 with worm screw clamp 194. Tubing 187 has longitudinal resilience for adapting to lengthwise movement of pipes 157 and 178 toward and away from one another during expansion and contraction of units 166 and 168.

Next, coupling segment 185 is shifted longitudinally in collar 195 in the original direction, from left to right, to the central position shown in FIG. 12. Thus, the segment is now within the retainer rings 183, 184, O-rings 181, 182, and expansion barrels 179, 180 of both the units 166, 168. Both free ends 170, 176 of pipes 157,178, as well as tubing 187, are no longer exposed, being hidden within the joint as shown in FIG. 12.

Water- and air-tight seals are now completed between the air distributor coupling segment 185 and the expansion barrels 179 and 180 by tightening both threaded retainer rings 183, 184 against their respective lubricated O-rings 181, 182. With controlled tightening of the retainer rings, resulting in only moderate compression of the O-rings, it is possible to attain the desired water- and air-tight seal and preserve the ability of the coupling segment 185 and expansion barrels 179, 180 to undergo relative sliding movement when the units 166 and 168 expand and contract. Collar 195 may if desired be provided with means (not shown) to prevent relative sliding movement between the collar and coupling segment 185.

DEFINITIONS

Aeration Gas—This is a gas, as defined herein, which includes one or more oxygen-containing gases, such as pure oxygen or air, and is able to deliver oxygen to a liquid medium and/or to the contents of the liquid medium when distributed in the liquid medium in the form of bubbles, but is less aggressive towards foulant deposits than a cleaning gas, as defined herein.

Aqueous Medium—An "aqueous medium" is water or a combination of water and one or more other liquid, solid or gaseous components, said water or combination being liquid to a sufficient extent to form gas bubbles therein when gas is discharged into the medium through a fine pore diffuser. Also, at least one of the components of the medium, which may be one or more foulant(s) and/or one of the other components of such medium, is subject to beneficial change in a pre-determined manner in response to discharge of a aeration gas therein. A preferred category of such media is aqueous waste liquors, such as for example, the mixed liquors treated in the activated sludge process, refinery and brewery waste liquors, paper mill white water, and the like.

Bubble Release Vacuum (BRV)—BRV is a test procedure useful for assessing the degree of uniformity of the effective pore diameter of pores at the pore openings on the surfaces of cleaned or fouled diffusion elements. BRV may be used as a manufacturing control by measuring the BRVs of diffusion elements a given type as they are produced, and comparing these BRVs with an established specification. New or thoroughly cleaned diffusion elements of different types may be characterized on the basis of their BRVs and may be compared with one another by comparing their BRVs. The extent of fouling of an element after a period of aeration service may be determined by taking BRV data on the element after such service and comparing that data with BRV measurements taken on the same elements or with BRV measurements taken on other comparable new or thoroughly cleaned elements.

The test procedure measures the vacuum, which may be conveniently expressed in inches of water guage, that is required to emit bubbles at a given flux from a localized area, encompassed within the boundaries of a test probe held against the surface of a thoroughly wetted element. In addition to a vacuum source, the test apparatus also includes a manometer to measure the vacuum, and a rotameter to measure the flux.

The value of the test results is enhanced by making and averaging several measurements, preferably a statistically number of measurements, on each element tested. Further enhancement is gained by making such tests at locations which have been selected according to a predetermined plan to distribute the measurement locations widely over the element gas discharge surface. Further description of the technique may be found on pages 275-278 of the above-identified EPA Design Manual.

Cleaning—Cleaning, a process applicable to the diffusion elements of fine pore diffusers, includes at least partially or wholly preventing, retarding, removing or beneficially modifying foulant deposits or increasing the available aeration discharge surface of the elements, with the aid of a cleaning fluid. Depending on the nature of the foulant deposit, cleaning may result in substantial reduction of any increased level of element DWP or BRV, above the base condition, which is attributable to foulant deposits, or may reduce the amount of BRV which is attributable to such deposits.

Cleaning Fluid—A cleaning fluid is a fluid, as defined herein, that is sufficiently aggressive toward foulant deposits to accomplish cleaning of the foulants when introduced, with or without aeration gas, in a given concentration and in a given amount, into the gas discharge passages of the diffusion element of a fine pore diffuser. Such fluid may act in any effective mode, such as for example: by dissolving the foulant, especially in the case of precipitated inorganic salt deposits; by dissolving or otherwise weakening material which attaches the foulant to the diffusion element, thereby destroying or assisting in destroying the bond between the foulant and the element; by poisoning, especially in the case of living foulants which may by poisoning be caused to detach from the diffusion element during and/or subsequent to application of the cleaning fluid; in any other suitable mode; or in a combination of modes.

Coefficient of Variation—For purposes of the present invention, the "coefficient of variation" is the quotient obtained by dividing the "standard deviation" by the "mean." The "standard deviation" represents the root mean square of the deviations from the mean of a stated number of bubble release vacuum measurements. The "mean" is the arithmetic average of the aforesaid bubble release vacuum measurements. Optimum accuracy is obtained by determining bubble release vacuum at random points representative of substantially the entire gas discharge surface of the element, but we have found that with circular plates we can obtain information that is sufficiently accurate to be useful by sampling the bubble release vacuum at at least 5 equally spaced points along each of two mutually perpendicular diameters of the plates.

Dynamic Wet Pressure (DWP)—Dynamic wet pressure is the pressure differential between the influent surface of a diffusion element and the hydrostatic head at a point of bubble formation. It is a measure of the resistance to gas flow of an area release diffusion element, including the effects of friction in the gas discharge passages of the element and at the influent and effluent ends of such passages, as well as the effects of surface tension at the effluent ends of the passages. One convenient method for determining the dynamic wet pressure is to determine the difference between the hydrostatic head in the liquid medium at the effluent surface of the diffusion element and the total gas pressure at the influent surface of the element expressed in terms of inches of water gauge.

Enhanced Pressure Differential—A dynamic wet pressure differential maintained during gas cleaning which is greater than the differential that would have existed if the only change in apparatus and operating conditions had been the successive removal of foulant deposits by the cleaning gas.

Fine Pore Diffuser—The term fine pore diffuser encompasses devices with widely varying designs, features, shapes, materials of construction and methods of operation, such as for example porous ceramic disks, plates, domes and tubes; rigid porous plastic disks, plates, tubes; and elastomeric membrane disks, sheets, and tubes. Their unifying factor is their ability to release fine aeration gas bubbles into an aqueous medium.

When new and operating in clear water, these devices are capable of discharging bubbles with an average diameter of about 0.2 inches or less. More preferably, on the basis of bubble count, at least about 70%, still more preferably about 85% and most preferably at least about 90% of the bubbles so discharged are about 0.2 inches or less in diameter. In the alternative, or preferably in addition to producing bubbles with the foregoing diameters, these diffusers will produce a headloss due to surface tension of about two inches of water guage when operating in clean water.

The foregoing values of bubble diameter and headloss are predicated on operation of the fine pore diffuser at a flux which is characteristic of normal operating conditions for the diffuser or for the process in which it is employed. In the alternative, the above values of clean water bubble diameter and/or headloss will be produced over at least a portion, and preferably over at least about 10% of, a flux range of about 0.25 SCFM to about 25 SCFM, more preferably about 0.5 SCFM to about 20 SCFM, and still more preferably about 1 to about 10 SCFM.

Fluid—A fluid is a medium which is wholly or at least substantially all liquid, or is wholly or at least substantially all gaseous, as defined herein, or is a fluent mixture of components comprising at least liquid and/or gaseous material, and which may or may not also contain solid materials. If solid materials are present, the amount will be restricted to the extent necessary for the fluid to perform its intended function satisfactorily.

Foulant—A "foulant" is any material, present in a liquid medium and/or in an aeration gas, which tends to form a deposit at (including in or adjacent) the inlets and/or outlets of gas discharge passages of a fine pore diffuser or within such passages in such a manner as to affect the gas pressure/flow relationship and/or oxygen transfer efficiency of the diffuser, such as for example by impeding flow or impairing uniformity of distribution of aeration gas discharged through a given element or group of such elements.

The foulant and/or resultant deposits may be of natural and/or synthetic origin, organic and/or inorganic, living or non-living, and composed of liquid, solid and/or gaseous components. Non-limiting examples of the more common foulants are fungal and bacterial strains, algae, protozoa, rotifers, higher life forms, oily residues, organic pipe coatings, soap and detergent residues, dust, rust and other metal oxides, hydroxides and inorganic salts. Examples of these salts include the carbonates and sulfates of such metals as calcium, magnesium, copper, aluminum, iron and other substances which may be suspended in or dissolved in a liquid medium and be rendered less soluble by any means, especially by discharge of aeration gas into the liquid medium at its interface with a diffusion element.

The term "present" is employed in this definition in the broadest possible sense so as to embrace foulants which are present in any form of admixture such as, for example, suspensions, dispersions, emulsions, solutions and other forms.

The deposits are usually, but not necessarily, adherent to the diffusion element and tenacious in the sense that under normal conditions of discharge, the aeration gas will not sufficiently remove them from the diffusion elements to overcome their above-indicated effects on gas flow.

The term deposits is also used in a broad sense to include solid and/or liquid components in the form of pasty, semi-solid or solid particles or masses, such as for example, slimes, scales and other incrustations.

The formation of deposits may occur in any manner such as, for example: by mere lodgment, as when a rust particle borne by aeration gas enters the inlet of a gas discharge passage of a diffusion element and lodges within; by accretion, as when tiny oil droplets and dust particles borne by aeration gas adhere to one another and to the influent surface of the element, combining to form a gradually enlarging mass which partly or fully obstructs the inlets of gas discharge passages; by organic growth, as when one or more life-forms present in the liquid medium at the effluent surface of the diffusion element forms layers or networks at such surface which impede the flow of aeration gas or cause coarse bubbling or at least impair uniformity of aeration gas distribution; by ingestion, as when suspended solids in the liquid medium are borne into the gas discharge passages by a reverse flow of liquid medium through the diffusion element when the flow of aeration gas is intentionally or unintentionally suspended; or by precipitation (including crystallization), as when insolubilized inorganic salts are deposited in the gas discharge passages and/or at their outlets during discharge of the aeration gas.

Gas, Gaseous—For purposes of the present invention a gas or a gaseous material may be a true gas, or a mixture of such gases, or a vapor, or mixture of vapors, or a mixture of gas and vapor, and may also include entrained liquids or solids in the form of fine or substantially colloidal droplets or particles, which is in the gaseous state to a sufficient extent under conditions of use for forming bubbles when discharged through a fine pore diffusion element into a liquid medium.

Mean Bubble Release Vacuum—The arithmetic average of a statistically significant number of bubble release vacuum measurements at randomly or systematically established locations on any surface of a diffusion element.

SCFM—This refers to the rate of gas flowing in terms of cubic feet per minute, corrected to a temperature of 20° C., an absolute pressure of 760 mm of mercury and a relative humidity of 36%.

Tank Type Process—For purposes of the present invention, a tank type process is a process of discharging aeration gas into an aqueous medium at a rate of at least about 2, more preferably at least about 4, and still more preferably at least about 6 SCFM per 1000 cubic feet of liquid medium. Alternately, or in combination with the foregoing, a tank-type process may be characterized by an average liquid medium retention time of less than about 48 hours, more commonly less than 24 hours, and quite frequently less than 12 hours.

Other Definitions—For definitions of other terms used herein please refer to the definitions in Schmit et al, U.S. Pat. No. 4,382,867.

MODIFICATIONS

The foregoing are but a few of many possible embodiments of the invention, and persons skilled in the art will, with and without application of non-obvious modifications, evolve a variety of new or alternative embodiments without departing from the spirit of the invention. It should thus be understood that this patent is intended, and should be construed, to cover all embodiments failing within the scope of the following claims and their equivalents.

I claim:

1. Apparatus for aeration of wastewater with an aeration gas, comprising:
    A. a tank having wall means including a floor for holding wastewater which is to be aerated by said aeration gas;
    B. a multiplicity of fine pore diffusers respectively comprising plenums and diffusion elements which are mounted in a portion of said tank and which will be submerged in said wastewater when said diffusers are in normal operation;
    C. cleaning fluid conduits defining one or more cleaning fluid channels
        1. running from a source of cleaning fluid to the multiplicity of plenums, and
        2. connected with said plenums for simultaneously
            a. feeding cleaning fluid from said source to said plenums and to the diffusion elements mounted thereon and
            b. cleaning the diffusion elements; and
    D. aeration gas conduits defining one or more aeration gas channels separate from said cleaning fluid channel(s), running from a source of aeration gas to said plenums and connected with said plenums for supplying aeration gas thereto separately from said cleaning fluid.

2. Apparatus according to claim 1 wherein said aeration gas channels include substantially horizontally disposed aeration gas conduits which will be submerged in said wastewater when said diffusers are in normal operation, and wherein said cleaning fluid conduits run along the outsides of said horizontally disposed conduits to said plenums.

3. Apparatus according to claim 1 wherein said aeration gas channels include substantially horizontally disposed aeration gas conduits which will be submerged in said wastewater when said diffusers are in normal operation, and wherein said cleaning fluid conduits run along the insides of said horizontally disposed conduits to said plenums.

4. Apparatus for aeration of water, comprising
    A. a water impound having wall means including a floor for retention of water during aeration thereof;
    B. an aeration gas channel
        1. including an attachment for connecting the channel with a source of aeration gas and
        2. having a plurality of aeration gas conduits, at least portions of which extend generally horizontally within a zone in said tank which will be submerged in said water when said tank is in normal operation;
    C. a multiplicity of fine pore diffusers mounted at longitudinally spaced intervals along the lengths of, and in communication with the interiors of, the generally horizontal portions of said aeration gas conduits;
    D. at least one cleaning fluid channel having an inlet for receiving cleaning fluid from a source of such fluid and at least one conduit for conveying such fluid from said inlet to said impound for in situ cleaning of the diffusers, said at least one cleaning fluid channel
        1. including plural members within said zone that respectively have substantially separate and substantially direct connections to plural diffusers, and
        2. defining cleaning fluid flow paths which remain substantially separate from said aeration gas channel in those parts of said flow paths which extend from said inlet to said diffusers.

5. Apparatus according to claim 4 wherein said diffusers are multi-pore diffusion elements.

6. Apparatus according to claim 4 wherein said diffusers include plenums.

7. Apparatus according to claim 4 wherein said diffusers include plenums and said aeration gas conduit portions communicate with said diffusers through said plenums.

8. Apparatus according to claim 4 wherein said aeration gas conduit portions communicate with said diffusers to provide flows of aeration gas from said aeration gas channel in the direction of and into said plenums, and said apparatus includes retarding means for substantially retarding flow of cleaning fluid in the reverse direction from said plenums into said aeration gas channel.

9. Apparatus according to claim 4 wherein said aeration gas conduit portions communicate with said diffusers to provide flows of aeration gas from said aeration gas channel in the direction of and into said plenums, and said apparatus includes one-way valve means positioned for substantially preventing flow of cleaning fluid in the reverse direction from said plenums into said aeration gas channel.

10. Apparatus according to claim 4 wherein said diffusers include plenums and said aeration gas conduit portions communicate with said plenums through aeration gas flow regulating means to provide flows of aeration gas of controlled flow rate from said aeration gas channel in the direction of and into said plenums.

11. Apparatus according to claim 10 wherein said aeration gas flow regulating means include one-way valve means positioned for substantially preventing flow of cleaning fluid in the reverse direction from said plenums into said aeration gas channel.

12. Apparatus according to claim 11 wherein said one-way valve means are positioned within said plenums.

13. Apparatus according to claim 4 wherein said diffusers include plenums and said plural members communicate with said diffusers through said plenums.

14. Apparatus according to claim 4 wherein said plural members include plural tee connectors having their base legs connected with the diffusers.

15. Apparatus according to claim 4 wherein said diffusers include plenums having surrounding wall means and said plural members include plural tees having their base legs in communication with the plenums through said wall means with the diffusers.

16. Apparatus according to claim 4 wherein said plural members communicate with said diffusers to provide flows of cleaning fluid from said at least one cleaning fluid channel in the direction of and into said plenums, and said apparatus includes retarding means for substantially retarding flow of cleaning fluid in the reverse direction from said plenums into said cleaning fluid channel.

17. Apparatus according to claim 4 wherein said plural members communicate with said diffusers to provide flows of cleaning fluid from said at least one cleaning fluid channel in the direction of and into said plenums, and said apparatus includes one-way valve means positioned for substantially preventing flow of cleaning fluid in the reverse direction from said plenums into said cleaning fluid channel.

18. Apparatus according to claim 4 wherein said diffusers include plenums and said plural members communicate with said plenums through cleaning fluid flow regulating means to provide flows of cleaning fluid of controlled flow rate from said at least one cleaning fluid channel in the direction of and into said plenums.

19. Apparatus according to claim 18 wherein said cleaning fluid flow regulating means include one-way valve means positioned for substantially preventing flow of cleaning fluid in the reverse direction from said plenums into said cleaning fluid channel.

20. Apparatus according to claim 19 wherein said one-way valve means are positioned within said plenums.

21. Apparatus according to claim 4 wherein said cleaning fluid channel includes cleaning fluid conduit segments, each of which is positioned for passing cleaning fluid from a position adjacent one of said diffusers to a position adjacent another of said diffusers.

22. Apparatus according to claim 4 wherein said cleaning fluid channel includes cleaning fluid conduit segments which extend generally parallel to said generally horizontally extending portions of said aeration gas conduits within said zone.

23. Apparatus according to claim 4 wherein said cleaning fluid channel includes cleaning fluid conduit segments which extend along the outside of and closely adjacent said generally horizontally extending portions of said aeration gas conduits within said zone.

24. Apparatus according to claim 4 wherein said cleaning fluid channel includes cleaning fluid conduit segments which extend within said generally horizontally extending portions of said aeration gas conduits within said zone.

25. Apparatus according to claim 4 wherein said inlet is connected with a source of cleaning fluid.

26. Apparatus according to claim 25 wherein said source is a source of cleaning liquid.

27. Apparatus according to claim 25 wherein said source is a source of cleaning gas.

28. A method of assembling apparatus for aeration of water with an aeration gas, comprising fabricating aeration gas distributor assemblies by:
   A. securing to an aeration gas distribution conduit that is useful for defining at least a portion of an aeration gas channel, a plurality of plenums that are disposed at intervals of distance longitudinally along said conduit and are configured to receive diffusion elements useful for aerating water, and
   B. securing to said plurality of plenums one or more cleaning fluid distribution conduits respectively defining a cleaning fluid channel that is substantially separate from said aeration gas channel for supplying cleaning fluid to said plenums substantially separately from said aeration gas.

29. A method according to claim 28, further comprising:
   A. providing said plenums and said aeration gas conduit in forms constructed of synthetic resinous material;
   B. securing to said plenums diffusion elements for diffusing aeration gas into water;
   C. supporting a plurality of said aeration gas conduits substantially horizontally in a tank which in normal operation will contain water to be aerated;
   D. connecting said aeration gas conduits with a source of aeration gas comprising oxygen;
   E. supporting said cleaning fluid conduits in said tank; and
   F. securing said cleaning fluid conduits to an inlet for connection to a source of cleaning fluid which is aggressive toward organic or inorganic foulants.

30. A method of assembling apparatus for aeration of water with an aeration gas, comprising fabricating aeration gas distributor assemblies by:
   A. securing to an aeration gas distribution conduit that is useful for defining at least a portion of an aeration gas channel, a plurality of plenums that are disposed at intervals of distance longitudinally along said conduit and are configured to receive diffusion elements useful for aerating water, and
   B. securing to said aeration gas distribution conduit at least a portion of a cleaning fluid distribution channel which includes one or more cleaning fluid distribution conduits and further includes connectors that are coupled to said cleaning fluid distribution conduit(s) and are spaced longitudinally along said cleaning fluid distribution conduit(s) at the same intervals as, and are connected to, said plenums.

31. A method according to claim 30, further comprising:
   A. supporting an aeration gas manifold conduit horizontally in a tank and connecting one end of said aeration gas manifold conduit with an attachment for connecting said conduit with an aeration gas source;
   B. supporting a cleaning fluid manifold conduit horizontally in the tank and connecting one end of said cleaning manifold conduit with an inlet for connecting said conduit with a cleaning fluid source;
   C. supporting said aeration gas distribution conduits horizontally in the tank and connecting said aeration gas distribution conduits to said aeration gas manifold conduit; and
   D. connecting said cleaning fluid distribution conduit(s) to said cleaning fluid manifold conduit.

32. A method according to claim 30, wherein said cleaning fluid distribution conduits are respectively secured outside said aeration gas distribution conduits.

33. A method according to claim 30, wherein said cleaning fluid distribution conduits are respectively secured inside said aeration gas distribution conduits.

34. A method according to claim 33, wherein said aeration gas distribution conduits have joints for passing cleaning gas from outside said aeration gas distribution conduits to inside said aeration gas distribution conduits and into said aeration gas distribution conduits.

35. A method of assembling apparatus for aeration of water with an aeration gas, comprising:
  A. fabricating at least a portion of a cleaning fluid channel comprising cleaning conduit and plural tee connectors positioned at longitudinally spaced intervals along said cleaning fluid channel portion, said tee connectors having base legs projecting laterally from said cleaning fluid channel portion;
  B. fabricating at least a portion of an aeration gas channel comprising aeration gas conduit having plural longitudinally spaced plenums secured thereto, such plenums
    1. being configured to receive diffusion elements,
    2. being spaced apart by intervals substantially similar to those of the tee connectors, and
    3. having walls with holes therethrough for receiving said tee connector base legs; and
  C. securing said cleaning fluid channel portion to said aeration gas channel portion by securing said tee connector base legs in communication with said holes.

36. A method according to claim 35 wherein said holes extend from the interiors of said plenums to the exteriors of said plenums, outside said aeration gas conduit, 37. A method according to claim 35 wherein said cleaning fluid channel portion is secured inside said aeration gas channel portion and said tee connector base legs communicate with the interiors of said plenums through openings in the aeration gas conduit that are spaced apart longitudinally along said conduit by intervals substantially similar to those of the tee connectors.

* * * * *